(12) United States Patent
Seo et al.

(10) Patent No.: US 10,321,229 B2
(45) Date of Patent: *Jun. 11, 2019

(54) WIRELESS SOUND EQUIPMENT

(71) Applicant: LG Electronics Inc., Seoul (KR)

(72) Inventors: Sangwoo Seo, Seoul (KR); Hyungwoo Park, Seoul (KR); Donghyun Kim, Seoul (KR); Hyunsun Yoo, Seoul (KR); Secheol Oh, Seoul (KR); Hyuksoo Chang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 162 days.

This patent is subject to a terminal disclaimer.

(21) Appl. No.: 15/393,674

(22) Filed: Dec. 29, 2016

(65) Prior Publication Data

US 2017/0111489 A1 Apr. 20, 2017

Related U.S. Application Data

(63) Continuation of application No. 14/504,993, filed on Oct. 2, 2014, now Pat. No. 9,571,928.

(30) Foreign Application Priority Data

| Mar. 13, 2014 | (KR) | 10-2014-0029480 |
| Mar. 13, 2014 | (KR) | 10-2014-0029482 |
| Mar. 21, 2014 | (KR) | 10-2014-0033307 |

(51) Int. Cl.
*B60N 2/02* (2006.01)
*G06F 3/16* (2006.01)
*H04R 1/10* (2006.01)
*H04R 3/00* (2006.01)
(Continued)

(52) U.S. Cl.
CPC ............. *H04R 3/00* (2013.01); *B60N 2/0244* (2013.01); *B60R 1/062* (2013.01); *G06F 3/165* (2013.01);
(Continued)

(58) Field of Classification Search
CPC ........ H04R 1/105; H04R 3/00; H04R 1/1091; H04R 1/1041; H04R 1/1033;
(Continued)

(56) References Cited

U.S. PATENT DOCUMENTS

| 7,570,977 B2 | 8/2009 | Gantz et al. |
| 2004/0125977 A1 | 7/2004 | Hong et al. |

(Continued)

FOREIGN PATENT DOCUMENTS

| CN | 2507194 Y | 8/2002 |
| CN | 101384098 A | 3/2009 |

(Continued)

*Primary Examiner* — Muhammad N Edun
(74) *Attorney, Agent, or Firm* — Birch, Stewart, Kolasch & Birch, LLP

(57) ABSTRACT

A wireless sound equipment including a band having elasticity, a housing provided at both ends of the band, the housing having a receiver holder formed in one end, a receiver coupled/decoupled to/from the receiver holder, a printed circuit board provided in the housing, a rotary member provided in the housing and an audio cable having one end connected to the rotary member and the other end connected to the receiver is provided. The rotary member includes an audio substrate connected to the printed circuit board and having a circular connecting terminal and an audio brush connected to the one end of the audio cable to transmit a signal transmitted from the printed circuit board to the audio cable while moving over the circular connecting terminal of the printed circuit board.

11 Claims, 35 Drawing Sheets

(51) Int. Cl.
*H04W 4/80* (2018.01)
*B60R 1/062* (2006.01)
*H04M 1/725* (2006.01)
*H04R 5/033* (2006.01)
*H04B 17/318* (2015.01)

(52) U.S. Cl.
CPC ........ *H04B 17/318* (2015.01); *H04M 1/7253* (2013.01); *H04M 1/72572* (2013.01); *H04R 1/105* (2013.01); *H04R 1/1033* (2013.01); *H04R 1/1041* (2013.01); *H04R 1/1091* (2013.01); *H04W 4/80* (2018.02); *H04R 1/1016* (2013.01); *H04R 5/033* (2013.01); *H04R 2420/07* (2013.01)

(58) Field of Classification Search
CPC .. H04R 2420/07; H04R 1/1016; H04R 5/033; H04W 4/80; G06F 3/165; B60N 2/0244; H04B 17/318; H04M 1/72572; H04M 1/7253; B60R 1/062
See application file for complete search history.

(56) References Cited

U.S. PATENT DOCUMENTS

| | | |
|---|---|---|
| 2006/0239491 A1 | 10/2006 | Ito |
| 2006/0243845 A1 | 11/2006 | Wegner |
| 2008/0143954 A1 | 6/2008 | Abreu |
| 2011/0188693 A1 | 8/2011 | Kim |
| 2014/0233754 A1 | 8/2014 | Chae et al. |

FOREIGN PATENT DOCUMENTS

| | | |
|---|---|---|
| CN | 102047687 A | 5/2011 |
| CN | 202059550 U | 11/2011 |
| JP | 2006-23837 A | 9/2006 |
| KR | 20-0228443 Y1 | 6/2001 |
| KR | 20-0420804 Y1 | 7/2006 |
| KR | 10-0762626 B1 | 10/2007 |
| KR | 10-1289244 B1 | 7/2013 |
| KR | 10-2013-0119629 A | 11/2013 |
| KR | 10-1365926 B1 | 2/2014 |
| WO | WO 2005/05642 A2 | 6/2005 |

(a)

(b)

(a)      (b)

(a)      (b)

(a)                       (b)

(a)                       (b)

(a)

(b)

WIRELESS SOUND EQUIPMENT

This application is a Continuation of copending U.S. application Ser. No. 14/504,993 filed on Oct. 2, 2014, which claims priority under 35 U.S.C. §119(a) to Korean Application No. 10-2014-0029480 filed on Mar. 13, 2014, Korean Application No. 10-2014-0029482 filed on Mar. 13, 2014 and Korean Application No. 10-2014-0033307 filed on Mar. 21, 2014, the contents of which are hereby incorporated by reference herein in their entireties.

BACKGROUND OF THE DISCLOSURE

Field of the Disclosure

Embodiments of the present disclosure relate to a wireless sound equipment configured to receive an audio signal from a terminal and to transmit a control signal for controlling the terminal via wireless communication with the terminal.

Discussion of the Related Art

A sound equipment means an audio device which can receive an audio signal from a terminal and transmit audio information collected via a microphone to the terminal. Conventionally, a wire type sound equipment is used which connects a terminal of a sound equipment to an ear jack of a terminal to receive an audio signal. Recently, there are increasing demands for a wireless communication type wireless sound equipment in an aspect of mobility and user convenience.

A wireless sound equipment having a design considering mobility is under development such as a headphone type wireless sound equipment, an ear wearable type wireless sound equipment and an ear inserting type wireless sound equipment. The headphone type is band-shaped to be worn on a user's head such that a user can carry it easily.

Recently, there are increasing demands for a wireless sound equipment having a band to be wearable on a user's neck to allow a user to carry easily even in case a receiver is not worn on a user's ear.

There are needs for a wireless sound equipment having an easy operation and an exterior design which forms a great part, because it is worn on a user's neck even if not used.

SUMMARY OF THE DISCLOSURE

An object of the present disclosure is to provide a wireless sound equipment having an improved use convenience.

To achieve these objects and other advantages and in accordance with the purpose of the disclosure, as embodied and broadly described herein, A wireless sound equipment including a band having elasticity, a housing provided at both ends of the band, the housing having a receiver holder formed in one end, a receiver coupled/decoupled to/from the receiver holder, a printed circuit board provided in the housing, a rotary member provided in the housing and an audio cable having one end connected to the rotary member and the other end connected to the receiver is provided. The rotary member includes an audio substrate connected to the printed circuit board and having a circular connecting terminal and an audio brush connected to the one end of the audio cable to transmit a signal transmitted from the printed circuit board to the audio cable while moving over the circular connecting terminal of the printed circuit board.

The wireless sound equipment may have a first section provided in a central portion of the band, with a large deformation and a second section provided in an end portion of the band, with a smaller deformation than the deformation of the first section.

The first section may be formed of an elastic material and the second section is formed of a rigid material.

The band may include a band frame formed of an elastic material; and a band cover provided in the second section, the band cover coupled to a circumference of the band frame.

The band may further include a third section provided between the first section and the second section, and the band cover may include a first band cover coupled to an inner portion of the band frame and a second band cover coupled to an outer portion of the band frame, and the band frame provided in the first section may be exposed and the band frame provided in the second section may have a circumference covered by the first band cover and the second band cover, and the band frame provided in the third section may be partially exposed.

At least one of a signal wire, an antenna and a battery may be mounted in the band.

The band may be formed in a tape shape, with a curved surface, and a direction of the curved surface may be different from a direction of a surface from a central portion and an end of the band.

The curved surface of the end of the band and the curved surface of the housing may form a continuous surface.

The rotatory member may further include a reel which the audio cable winds around.

The rotary member may further include a spiral spring having a band-shaped metallic plate winding on a plane in a coil shape, and a central portion of the spiral spring may be fixed to the housing and the other end of the spiral spring is connected to the reel.

A projection may be formed in an outer circumference of the reel, and a stopper may be provided adjacent to the reel and hooked to the projection by an elastic member applying a pulling force toward the reel, and a winding switch may be provided for a user to transmit a force in the reserve direction of the direction in which the elastic member applies a force, and when the user's force is applied to the winding switch, the stopper may be decoupled from the projection and the reel is rotated by the elastic force of the spiral spring, to wind the audio cable around the reel.

The stopper and the receiver holder may be provided on opposite sides of the rotary member.

The receiver holder may be provided between the stopper and the rotary member.

The housing may include a blocking layer for blocking the noise generated by the rotation of the reel.

The controller may further include a printed circuit board for transmitting a signal received from the wireless communication unit to the receiver via the audio cable, the printed circuit board comprising a circular electrode unit; and an audio brush connected to one end of the audio cable to transmit a signal transmitted from the printed circuit board to the audio cable, while moving over the electrode unit of the printed circuit board.

The wireless sound equipment may further include a first magnet coupled to the audio cable; and a second magnet coupled to the band, the second magnet magnetically detachable from the first magnet.

The wireless sound equipment may further include a third magnet coupled to the receiver hole; and a fourth magnet provided in the receiver, the fourth magnet magnetically detachable from a magnet provided in the receiver hole.

The controller may heighten the power in a speaker mode, when the receiver is coupled to the receiver holder and lower the power in an earphone mode, when the receiver is decoupled from the receiver holder.

An audio output direction in the speaker mode may be different from an audio output direction in the earphone mode in the receiver.

The wireless communication unit and the controller may be coupled to the receiver.

The housing may include an upper housing and a lower housing coupled to each other to form an internal space where the printed circuit board is provided close to the upper housing and the rotary member is provided between the printed circuit board and the lower housing.

The rotary member may be provided close to the receiver holder.

In another aspect, a wireless sound equipment includes a neck band formed in a curved shape, the neck band having a first receiver holder and a second receiver holder provided in both ends, respectively; a pair of audio cables extended from the neck band; a first receiver coupled to one end of the audio cable and coupled/decoupled to/from the first receiver holder; a second receiver coupled to one end of the audio cable and coupled/decoupled to/from the second receiver holder; a first switch switched into an ON state when the first receiver is decoupled from the first receiver holder and an OFF state when the first receiver is coupled to the first receiver holder; a second switch switched into an ON state when the second receiver is decoupled from the second receiver holder and an OFF state when the second receiver is coupled to the second receiver holder; a wireless communication module for transmitting/receiving a signal to/from a mobile terminal; and a controller for generating a control command to control the mobile terminal based on the ON/Off state change of the first and second switches to transmit the control command to the mobile terminal.

The controller may generate a first control signal, when the first switch is changed into an ON state, with the second switch in an OFF state.

The first control signal may include a control command for providing a contact list to the display of the mobile terminal or a phone number input keypad to the display.

When receiving a call signal, the first control signal may include a control command for connecting a call to the person on the other line of the call signal.

and a second control signal when the second switch is changed into an ON state, with the first switch in an ON state, and a third control signal having a control command for performing the reverse operation of the second control signal, when the second switch is changed into an OFF state, with the first switch in an ON state.

During the talk on the phone, the second control signal may include a control command for increasing a volume of the mobile terminal and the third control signal may include a control command for increasing a volume of the mobile terminal.

The controller may generate a fourth control signal when the second switch is changed into an OFF state with the first switch in an OFF state, and the fourth control signal may end the function activated by the first control signal.

When the second switch is changed into an ON state, with the first switch in an OFF state, a fifth control signal may be generated. The fifth control signal may include a command for providing a list of files to the display of the mobile terminal.

When the first switch is changed into an ON state with a second switch in an ON state, a sixth control signal may be generated.

When the first switch is changed into an OFF state with the second switch in an ON state, a seventh control signal may be generated and the seventh control signal may include a command for performing the reverse operation of the sixth control signal.

The sixth control signal may include a playing command for playing one of the multimedia files.

The seventh control signal may include a command for stopping the multimedia file playing.

When the second switch is changed into an OFF state with the first switch in an ON state, a third control signal may be generated and the third control signal may include a command for stopping the multimedia file playing currently.

When the second switch is changed into an ON state with the first switch in an OFF state, an eighth control signal is generated and the eighth control signal may end the function activated by the fifth control signal.

The switch may be one of a push button pressed or projected from the receiver holder and the second receiver holder in accordance with the decoupling of the first receiver and the second receiver, a hall sensor for sensing magnets provided in the first receiver and the second receiver, and a proximity sensor for sensing the approach of the first receiver or second receiver.

The wireless sound equipment may further include a reel for winding the audio cable there around; and a rotary member for rotating the reel to winding the audio cable around the reel.

The switch may sense the rotational number of the reel to sense whether the first receiver and the second receiver are decoupled from the first receiver holder and the second receiver holder.

The control commands may perform control based on the rotational number of the reel gradually.

In a further aspect, a wireless sound equipment include a short range communication module for transmitting/receiving a wireless signal to/from an external device; a signal sensing unit for measuring RSSI (Received Signal Strength Indicator) of the signal for each of the external devices after sensing the strength of the signal transmitted/received to/from the external device, only to recognize the distance with the external devices; and a controller for changing the function of the mobile terminal based on a distance with the external device. The controller may unlock a locked state when the external device is spaced apart a first distance or less and activate the mobile terminal. The controller may change the state of the other functions into a non-activated state, when the external device is spaced apart a second distance or less out of the first distance in a state where the mobile terminal is activated.

The implementing function is a photographing function and the controller may change the other functions except the reading function for the photographed pictures into a non-activation state.

The function implemented currently is a function for reading a plurality of files and the controller may restrict the reading of the files, except the file read currently, when the external device is spaced apart a second distance or less out of the first distance.

The function implemented currently is a function for reading and editing a file and the controller may restrict editing and deleting of the file, when the external device is spaced apart a second distance or less out of the first distance.

The controller may set a locked state of the mobile terminal or non-activate the mobile terminal, when the external device is spaced apart out of the second distance.

The controller may change the mobile terminal into a double lock state, when the external device is spaced apart out of a third distance farther than the second distance.

The controller may transmit location information to a server or another terminal forcibly or connect with the mobile terminal based on remote control, when the external device is spaced apart out of a third distance farther than the second distance.

The controller may receive a call signal and change the call signal to another mobile terminal automatically, when the external device is spaced apart out of a third distance farther than the second distance.

The third distance may be the distance in which the external device and the mobile terminal are disconnected.

The plurality of the external devices may be provided and the first distance may be set differently based on the type of the external device.

The external device may be a headset for receiving an audio signal from the mobile terminal and outputting the audio signal. The headset is connected with the short range communication module. When the user brings the mobile terminal to the face and the headset is located as close as a fourth distance or less, the controller disconnect the connection with the headset and activate the receiver of the mobile terminal.

When the receiver of the headset is coupled to the receiver holder in a state where the headset is connected to the short range communication module, the controller may activate the receiver of the mobile terminal.

When the external device is spaced apart a fifth distance or less from the mobile terminal, the controller may receive information from the external device via the wireless communication unit and output the received information to the display or control the external device, using the wireless communication unit.

The external device is a vehicle and the controller may adjust locations of a seat, a back mirror and a side mirror and control setting of playing music, based on the user information.

When the strength of the signal is a preset value or more (a reference value of the signal strength or more), it is controlled that the mobile terminal 100 is connected and a specific function is implemented.

The effects of the wireless sound equipment according to the embodiments of the disclosure will be as follows.

The bending degree of the band is realized gradually. When the user is wearing the band of the wireless sound equipment on the neck, the user may feel convenient and prevent the disadvantage of easy separation from the neck and movement on the neck.

Furthermore, the structure allowing the user to keep the receiver in the receiver holder easily may be provided and there is a simple advantage of simply hand-carry of the receiver.

Still further, the receiver is coupled to or decoupled from the receiver holder such that the mobile terminal can be controlled. The receiver is decoupled and put on the user's ears. Accordingly, the additional operation of the mobile terminal or pressing of the button provided in the wireless sound equipment may be omitted.

It is to be understood that both the foregoing general description and the following detailed description are exemplary and explanatory and are intended to provide further explanation of the disclosed subject matter as claimed.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
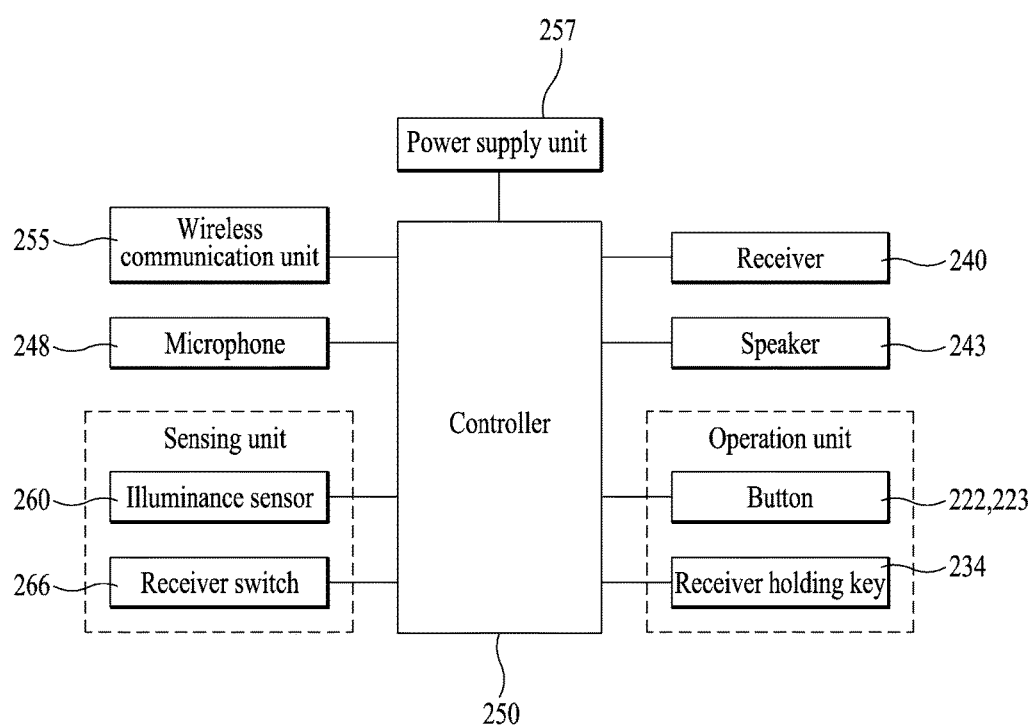
FIG. 1 is a block diagram illustrating a structure of a wireless sound equipment according to one embodiment of the present disclosure.

FIG. 1 is a block diagram of a wireless sound equipment according to one embodiment of the disclosure. The wireless sound equipment according to embodiments of the disclosure includes a controller 250, a wireless communication unit 255, a receiver 240, a speaker 243, a microphone 248, a sensing unit, an operation control unit and a power supply unit 257.

The wireless communication unit may receive an audio signal from an external terminal or external server or transmit a sound or signal input via the wireless sound equipment to the external terminal or server wirelessly. A typical example of the wireless communication unit may be BLUETOOTH.

BLUETOOTH is a typical near field communication technical standard for connecting two hand-carry devices (e.g., mobile terminals, notebooks, earphones and headphones) to exchange information with each other and it is used when low power wireless connection is needed in an ultra-short range of 10~20 meters. BLUETOOTH uses 2400~2483.5 MHz which is ISM (Industrial Scientific and Medical) frequency band.

To block interference of other systems using upper and lower frequencies, BLUETOOTH uses total 79 channels of 2402~2480 MHz except a range of 2 MHz higher than 2400 MHz and 3.5 MHz lower than 2483.5 MHz. ISM is a frequency band assigned for industrial, scientific and medical use and it is used in a personal wireless device which can emit low power electric waves, without permission to use electric waves. Amateur radio, wireless LAN and BLUETOOTH uses the ISM band.

The receiver 240 and the speaker 243 are devices for outputting sounds. The receiver 240 is configured to transmit a sound when it is near the user's ear. The speaker 243 is a device for transmitting a sound to the user when it is held in a rest. The volume of the sound output from the receiver 240 is lower than the volume of the sound output from the speaker 243.

The microphone 248 processes an audio signal input from an external device into electric voice data. The processed voice data is transmitted to the external terminal or server via the wireless communication unit 255. Various noise removal algorithms can be realized in the microphone to remove the noise generated while external audio signal is input.

The sensing unit is a device for recognizing a state of the wireless sound equipment 200 and peripheral context. The sensing unit may include an illuminance sensor 260 for sensing illuminance nearby, a touch sensor for sensing touch input, a gyro sensor for sensing a slope of and a location of the wireless sound equipment and a receiver switch 266 for sensing whether the receiver is located in a receiver holder.

The operation control unit is an input unit for allowing the user to control the wireless sound equipment 200 intentionally. The operation control unit includes buttons 222 and 223 for a call or control of an audio volume or a receiver holding key 234 for inserting the receiver in a receiver storage position.

Figure 2:
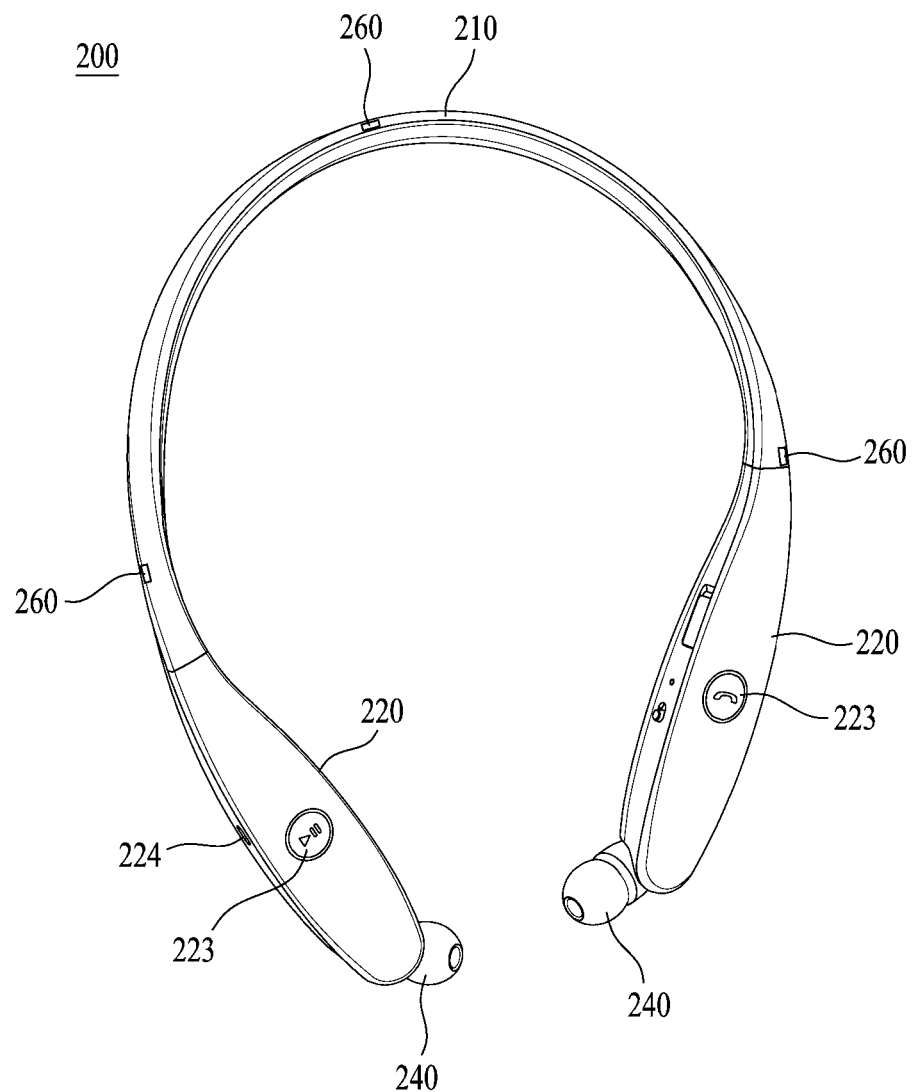
FIGS. 2 and 3 are perspective diagrams of a wireless sound equipment seen in one direction according to one embodiment of the present disclosure.
Figure 3:
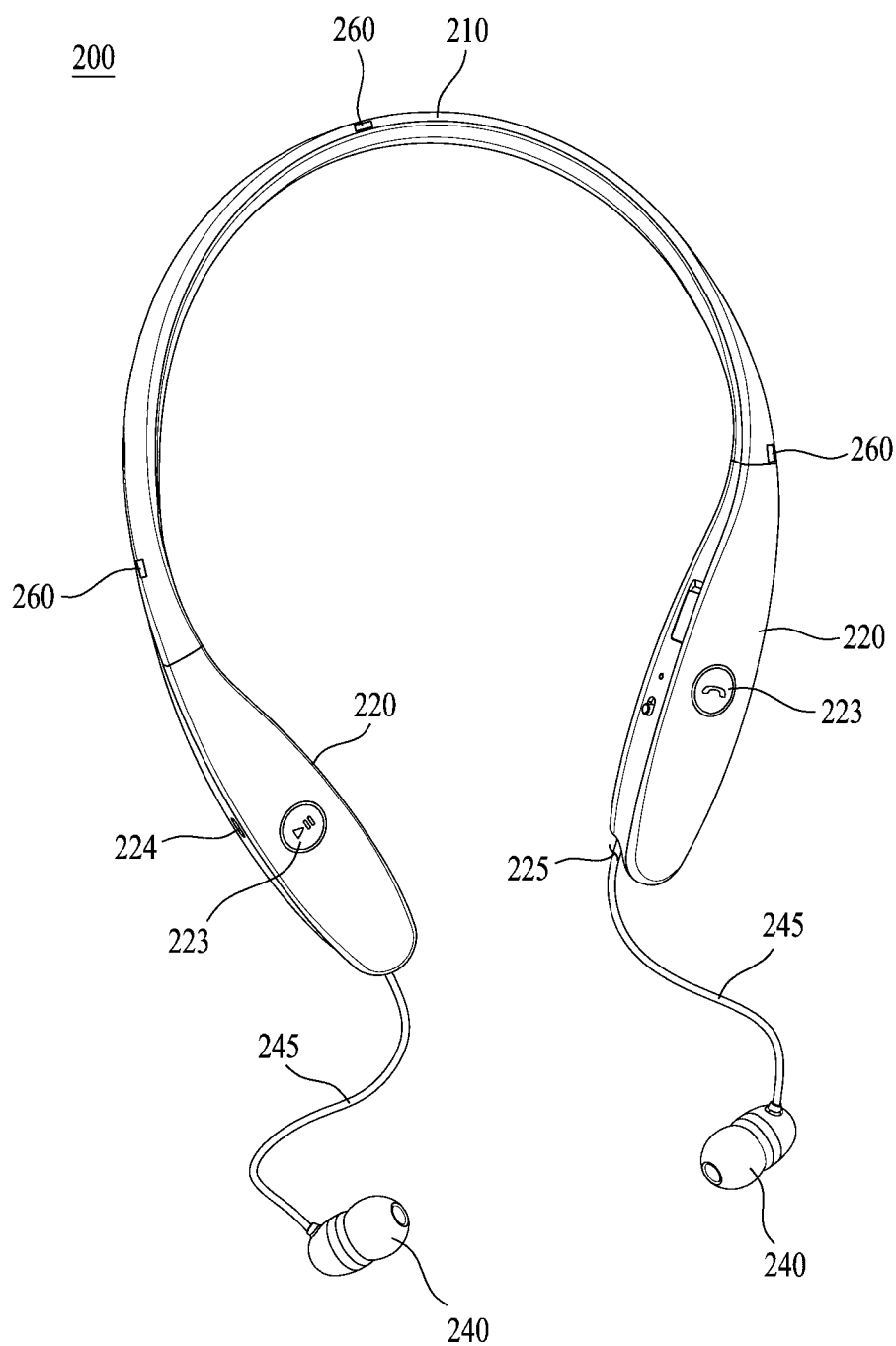
Figure 4:
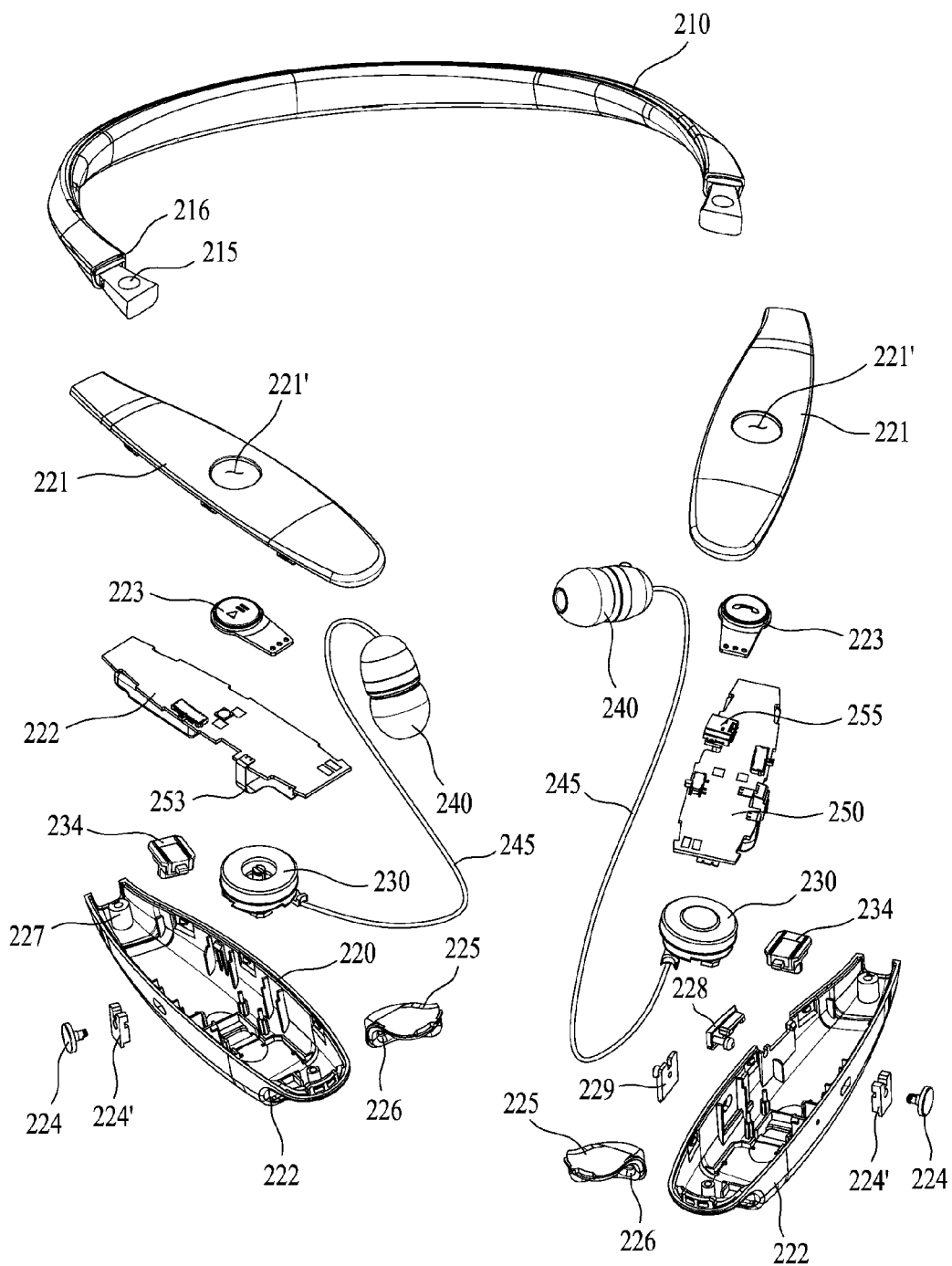
FIG. 4 is an exploded perspective diagram of a wireless sound equipment according to one embodiment of the disclosure.

FIGS. 2 and 3 are perspective diagrams of a wireless sound equipment seen in one direction according to one embodiment of the present disclosure. FIG. 4 is an exploded perspective diagram of a wireless sound equipment according to one embodiment of the disclosure. The wireless sound equipment 200 includes a band 210, a housing 220, an audio cable 245, a receiver 240, a wireless communication unit 255 and a controller 250.

Figure 5:
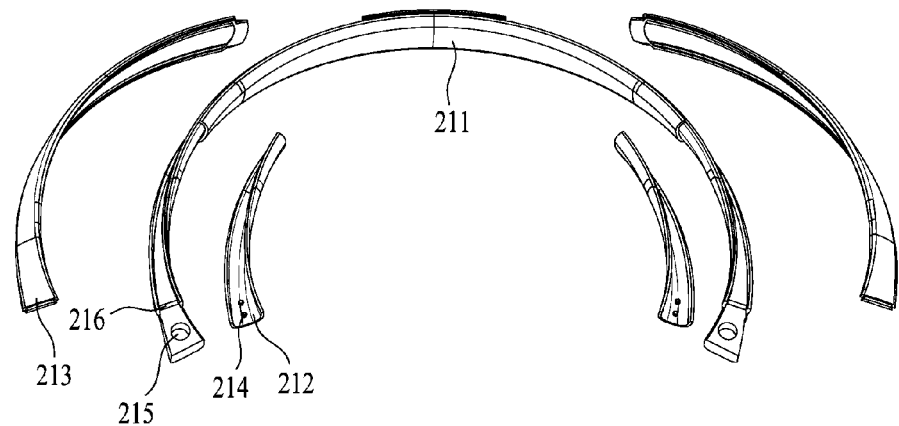
FIG. 5 is a an exploded perspective diagram of a band provided in a wireless sound equipment according to one embodiment of the disclosure.

The band 210 is a U-shaped material which can be put on the user's neck from a back of the neck. For convenient use, the band 210 may be formed of a bendable material. FIG. 5 is an exploded perspective diagram of the band 210. The band 210 includes a band frame 211 formed of a flexible material (e.g., rubber and silicon) and a band cover 212 and 213 coupled to a circumference of the band frame 211 to define the shape of the band 210. If the band 210 is formed of only a rigid material, it is uncomfortable for the user to wear the band 210. When the wireless sound equipment is carried in a bag, the band 210 formed of a rigid material might break. In contrast, when the band 210 is formed of a flexible material, the band 210 could be bent and separated from the neck with the user's big movement. Also, the band 210 cannot be fixed when the audio cable 245 is extracted, such that the wireless sound equipment 200 may move together with the audio cable 245. Accordingly, the band 210 according to embodiments of the disclosure may have a different bending degree for each section.

A central portion (a first section (a)) with the largest bending degree and both ends (a second section (b)) may be formed of a rigid material. When the user operates the buttons attached to the housing 220 or takes out the audio cable 245, deformation of the band 210 can be reduced as much as possible.

In the first section (a), the band covers 212 and 213 are not coupled to expose the band frame 211 formed of a flexible material to raise the bending deformation. The band covers 212 and 213 may not cover the entire area of the band frame 211, coupled to both ends (a second section (b) and a third section (c)) of the band frame 211.

At this time, the band cover may have a pair of band covers 212 and 213 coupled to an inner portion and an outer portion of the band frame 211. A first band cover 212 of the two band covers is located only in the second section (b) and a second band cover 213 of the two is located in the second section (b) and the third section (c). In other words, the first band cover 212 and the second band cover 213 are located in the second section (b), such that rigidity is high. Only the second band cover 213 is located in the third section (c) such that the rigidity is relatively low.

Accordingly, there is a difference of rigidity or bending deformation in the three sections (a, b and c). In a situation requiring bending deformation, the first section (a) is deformed. In a state where the user is wearing the band 210, the rigidities of the second section (b) and the third section (c) can prevent the wireless sound equipment from being separated or inclined during the operation. For coupling of the band frame 211 to the band covers 212 and 213, a coupling protrusion 214 may be formed. The band covers 212 and 213 may be formed of a material which is equal to a material used in forming the housing 220 coupled to an end of the band 210. Examples of such a material include an injection molding product.

A coupling structure 215 and 227 may be provided to couple the housing 220 to the end of the band 210. A projection 227 formed in the housing may be fixedly inserted in a hole 215 formed in the end of the band 210. At this time, a raised spot 216 may be further provided in an end of the band 220 to prevent the housing from rotating on the projection 227.

A predetermined space is formed in the band 210 to receive the wire type power supply unit 257, the wireless communication unit 255 and the flexile printed circuit board for transmitting signals.

A cross section of the band 210 may be formed in a long tape shape which is long along one direction. In other words, the cross section of the band 210 has a curved surface and a direction of the curved surface may be twisted as shown in FIGS. 4 and 5. When the band is worn on the neck, a central portion of the band 210 has a curved surface of which direction is toward a front surface and a rear surface and an end of the band 210 has a curved surface of which can be differentiated to be upward/downward and to be placed on the shoulder. At this time, the curved surfaces may be continuously connected.

Such twisted tape shaped band 210 is twisted in a shape corresponding to the user's body shape. When the band 210 is worn, a touched portion with the body part is wide and the user feels comfortable. Especially, the first band cover 212 provided in the band 210 is relatively short to enlarge an exposed portion of the band frame 211 formed of rubber or silicon which is in contact with the user's body part, such that the friction with the user can be enhanced.

The housing 220 is provided in both ends of the band 210. The curved surface formed by the band 210 and the surface formed by the housing 2220 may form a continuous surface toward the same direction.

The upper housing 221 and the lower housing 222 are coupled to each other to form an internal space. The printed circuit board 250, a vibrator motor (not shown), the wireless communication unit 255 and the like may be mounted in the internal space. The power supply unit 257 may be provided in a predetermined portion of the housing 220 and the microphone 248, the speaker 243, the wireless communication unit 255 and the other elements may be arranged in the other portion of the housing 220. Accordingly, the elements mounted in the housing 220 may be dispersed to keep a balance of the both weights.

A first button 223 for playing or calling may be provided in a front surface of the housing 220 and a second button 224 for controlling a sound volume or changing the order of the played files may be provided in a lateral surface of the housing 220. Examples of the buttons 223 and 224 may include a jog button, a slide button pushed to input a signal and a dome switch button having a dome switch. At this time, holes may be formed in the housing 220. At this time, holes for the first button 223 and the second button 224 may be formed in the housing 220. The user touches the buttons 223 and 224 to input a signal, using a touch sensor.

The pair of the buttons 223 and 224 provided in the housing 220 may be distinguished from each other based on functions. For instance, one of the buttons may be set to have a function related with calling and the other one may be set to have another function related with music. The first button 223 provided in the portion of the housing 220 may be a calling button and the second button 224 may be a button for controlling a sound volume.

The first button 223 provided in the other portion of the housing 220 may be used as a button for playing or stopping a music file and the second button 224 may be used as a button for changing the order of playing files. A pair of audio cables 245 has one end connected to the housing 220 and the other end connected to the receiver 240. The audio cables may receive the audio signal through the wireless communication unit 255 mounted in the housing 220 and the audio signal is transmitted to the receiver 240 through the audio cables 245.

The receiver 240 may be inserted in the user's ear to be fitted to the ear. As shown in FIG. 3, the receiver 240 is coupled to a receiver holder 225 provided in the other end of the housing 220 connected to the band 210, to solve a disadvantage of tangle of the audio cables 245 when the band is carried with the user's body. The receiver holder may be a seating portion of the receiver 240 for carrying the receiver 240 which outputs the sound. Magnets may be provided in the receiver 240 and the receiver holder 225, respectively, such that the receiver 240 can be secured to the receiver holder 225, using a magnetic force. The receiver holder 225 may be an auxiliary injection mold provided in the end of the housing 220 and a hole may be formed in the receiver holder 225 to pass the audio cable 245 there through.

Figure 6:
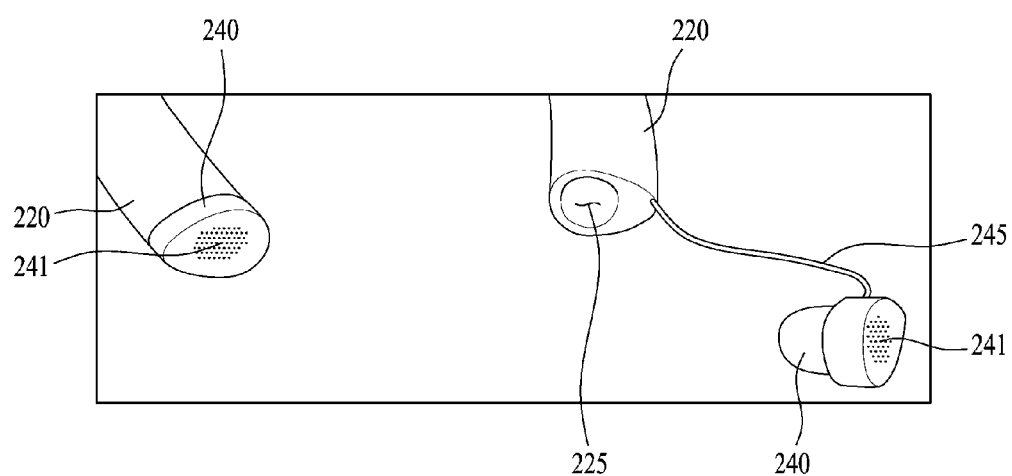
FIG. 6 is a diagram illustrating a receiver and a receiver holder which are provided in a wireless sound equipment according to another embodiment of the disclosure.

The receiver holder 225 shown in FIGS. 2 through 4 may be recessed from an outer surface of the housing or the receiver holder 225 shown in FIG. 6 may be a hole formed in the end of the housing 220.

The receiver holder 225 may include a receiver switch 226 to check whether the receiver holder 225 is coupled. For instance, the receiver switch 226 may be a push button receiver switch 226 projected from the receiver holder 225. When the receiver 240 is coupled to the receiver holder 225, the push button is pressed and the receiver switch 226 is switched off. When the receiver 240 is decoupled from the receiver holder 225, the push button is pulled and the receiver switch 226 may be switched on.

The ON/OFF state may be set in reverse. The receiver switch 226 may determine whether the receiver 240 is coupled to the receiver holder 225, using a magnetic sensor or a proximity sensor.

The receiver 240 may outputs a sound with a low power in an earphone mode and a sound with a high power in a speaker mode, such that it may be used in two ways as a speaker. The sound output spot may be the same in the earphone mode and the speaker mode. Alternatively, an auxiliary sound output hole 241 may be provided in the receiver 240 toward the reverse direction as shown in FIG. 6.

When a wireless communication unit 255 is provided in the receiver 240, except that the receiver 240 is connected to the audio cable 245 to receive a signal from the wireless communication unit 255 mounted in the housing, the audio cable 245 may be omitted. At this time, a small-sized battery may be provided only for the receiver 240. When the receiver 240 is coupled to the receiver holder 225, the small battery for the receiver 240 may be charged.

A charge terminal may be located in the housing 220 for charging and a cap 228 may be provided in the housing 220 to prevent the charge terminal from being exposed normally. In addition, a power switch 229 for switching the power of the wireless sound equipment 200 on and off may be provided in the housing 220.

An indicator may indicate whether the wireless communication unit 255 is connected to indicate a generated event or a charge state. A color and a blinking speed of the indicator shows a state of the wireless sound equipment 200. The indicator may be provided in a lateral surface of the housing 200 or around the first button 223.

In a headset 200 according to one embodiment, the audio cable 245 is inserted in the housing 220 and the receiver 240 is coupled to the receiver holder 225 as shown in FIG. 3. The audio cable 245 is inserted in the housing 220, while winding around the reel 230 provided in the housing 220.

Figure 7:
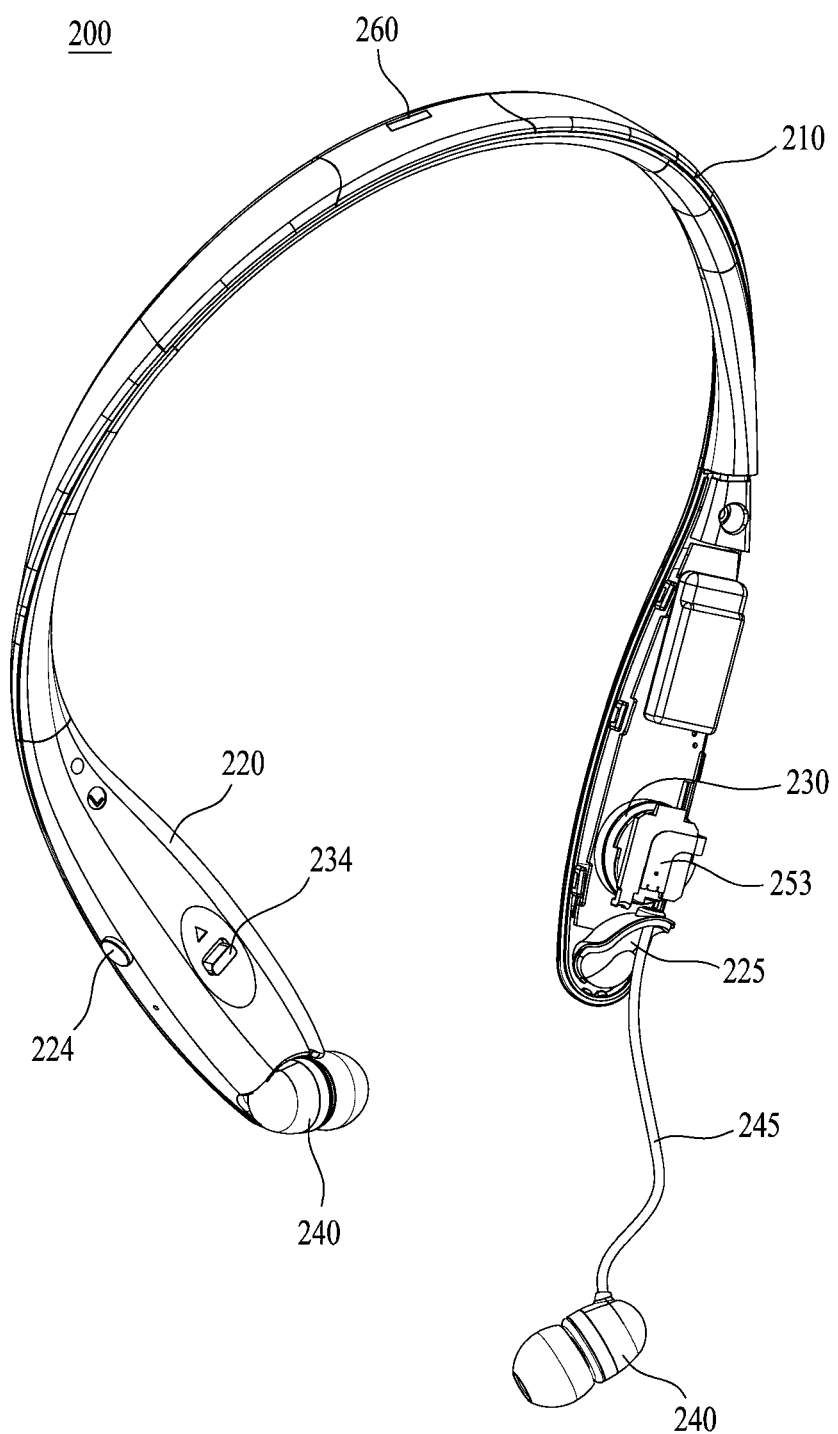
FIG. 7 is a perspective diagram partially illustrating a wireless sound equipment seen in another direction according to one embodiment of the disclosure.

FIG. 7 is a perspective diagram partially illustrating a wireless sound equipment seen in another direction according to one embodiment of the disclosure. In FIG. 7, the reel 230 the audio cable 245 is winding around is shown. The reel 230 is rotated on a shaft 239 fixed to the housing 220 by a rotary member to wind the audio cable 245 around an outer circumferential surface of the reel 230 so as to insert the audio cable 245 in the housing 220.

When the user pulls the receiver 240 to unwind the audio cable 245 from the reel 230, the reel 230 is rotated in the reverse direction of the direction in which the rotary member is rotated and the reel 230 is fixed by a stopper 233 in a state of being rotated as much as the audio cable 245 is pulled.

When the user releases the stopper 233 for fixing the reel 230, the reel 230 is re-rotated in the direction in which it is rotated by the rotary member and the audio cable 245 is inserted in the housing 220.

A flexible printed circuit board 253 may be further provided to transmit the signal to the audio cable 245 from the printed circuit board 250 and the flexible printed circuit board 253 may be extended from the printed circuit board 250.

Figure 8:
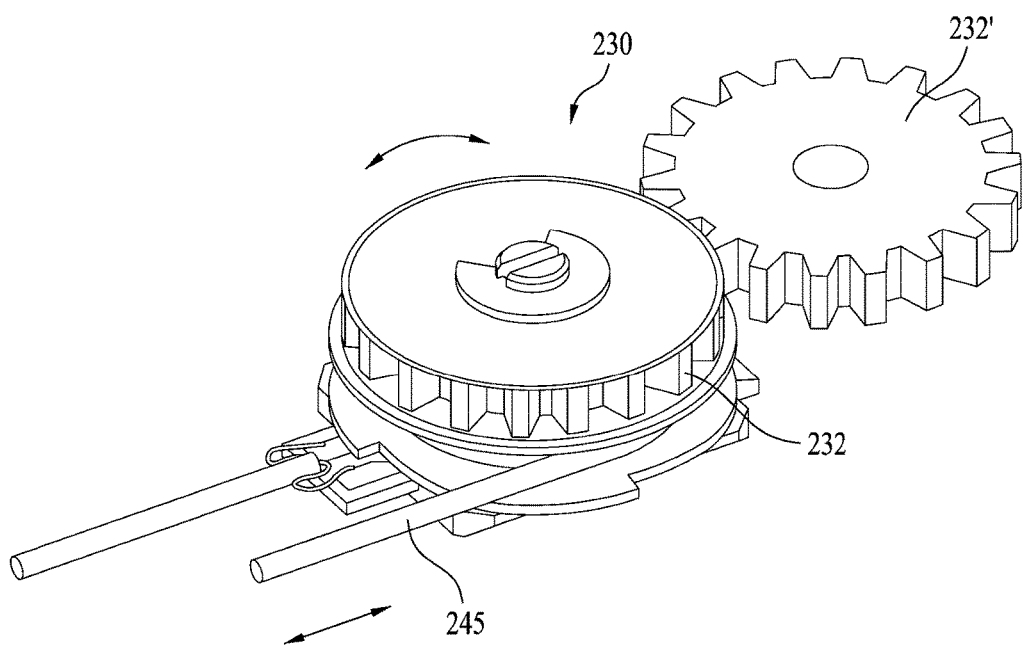
FIG. 8 is a diagram illustrating an audio cable winding around a reel provided in a wireless sound equipment according to one embodiment of the disclosure.
Figure 9:
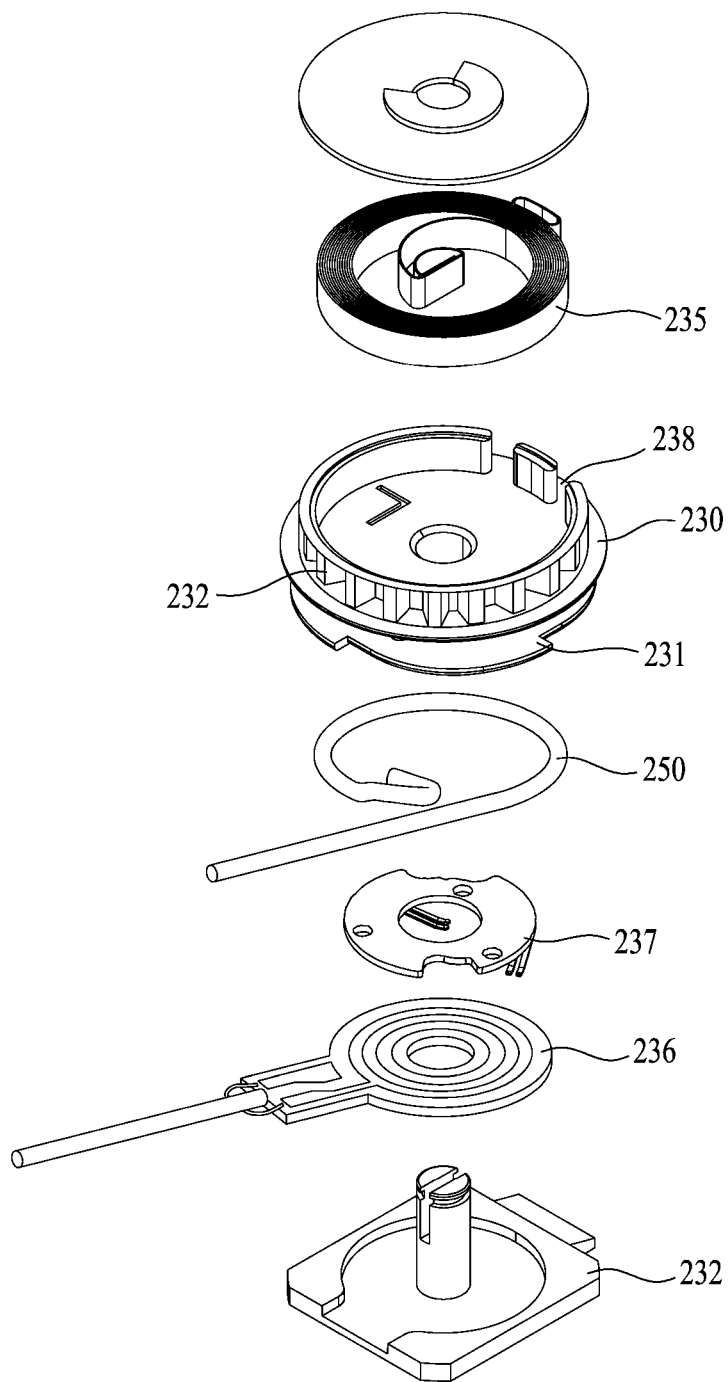
FIG. 9 is an exploded perspective diagram of an audio cable and a reel provided in a wireless sound equipment according to one embodiment of the disclosure.

FIG. 8 illustrates the audio cable 245 winding around the reel 230 of the wireless sound equipment 200 according to one embodiment of the disclosure. FIG. 9 is an exploded perspective diagram illustrating the reel 230 and the audio cable 245 provided in the wireless sound equipment 200 according to one embodiment of the disclosure.

The reel 230 is a cylindrical material which has the audio cable 245 wind around an outer circumferential surface thereof to receive the audio cable 245, while rotating on its center as a shaft 239. The reel 230 may include a groove 238 in which the audio cable 245 is inserted to fix the audio cable 245 to the reel 230. As shown in FIG. 9, the rotary member may be provided in the reel 230 to wind the audio cable 245 around the outer circumferential surface of the reel 230, while the reel 230 is rotating.

The rotary member may be a spiral spring 235 formed of a band-shaped metallic plate winding on a plane in a coil shape. A center of the spiral spring 235 is fixed to the housing 220 and the other end of the spiral spring 235 is connected to the reel 230. Accordingly, when the reel 230 is rotated in the reverse of the direction in which the spiral spring is winding, the audio cable 245 is unwinding to be drawn from the housing 220. At this time, the spiral spring 235 is unwinding loosely to generate an elastic force in a winding direction of the spiral spring 235.

The force is applied to the reel 230 by the spiral spring 235 in the direction in which the audio cable 245 is winding around the reel 230. To keep the audio cable 245 loose, a stopper 233 and a projection 231 may be further provided to stop the reel 230 from being rotated by the spiral spring 235.

Figure 10:
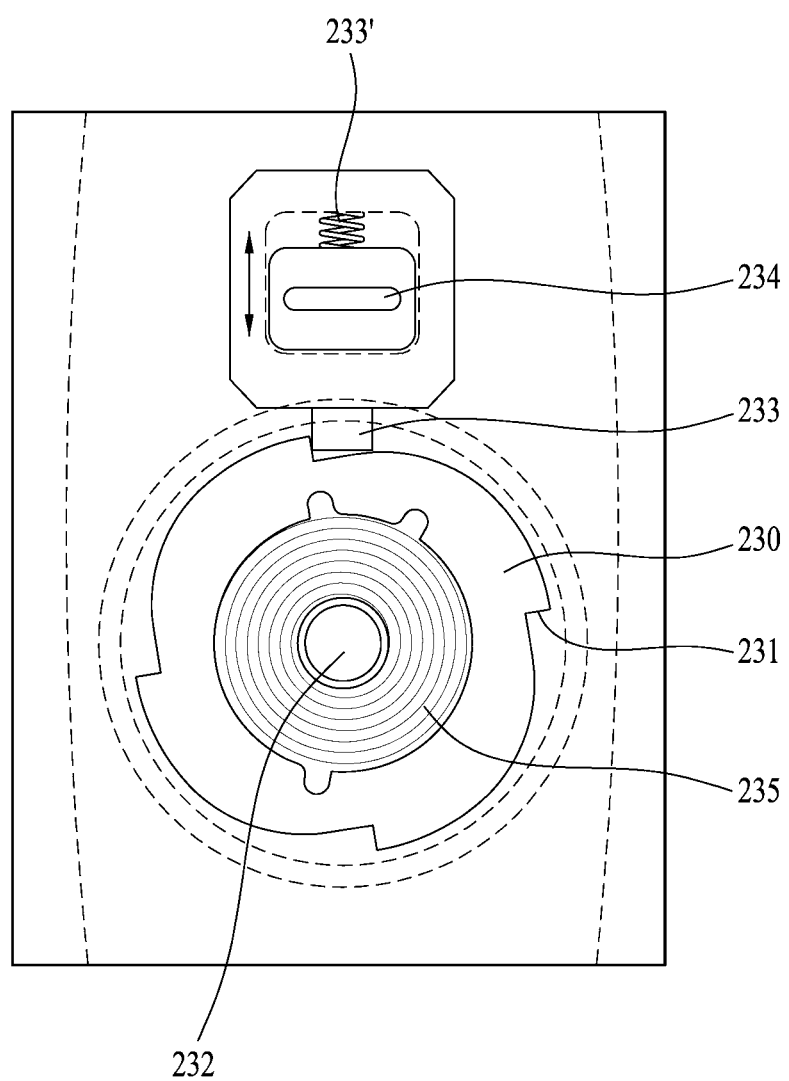
FIG. 10 is a sectional diagram illustrating a rotary member and a reel of a wireless sound equipment according to one embodiment of the disclosure.
Figure 11:
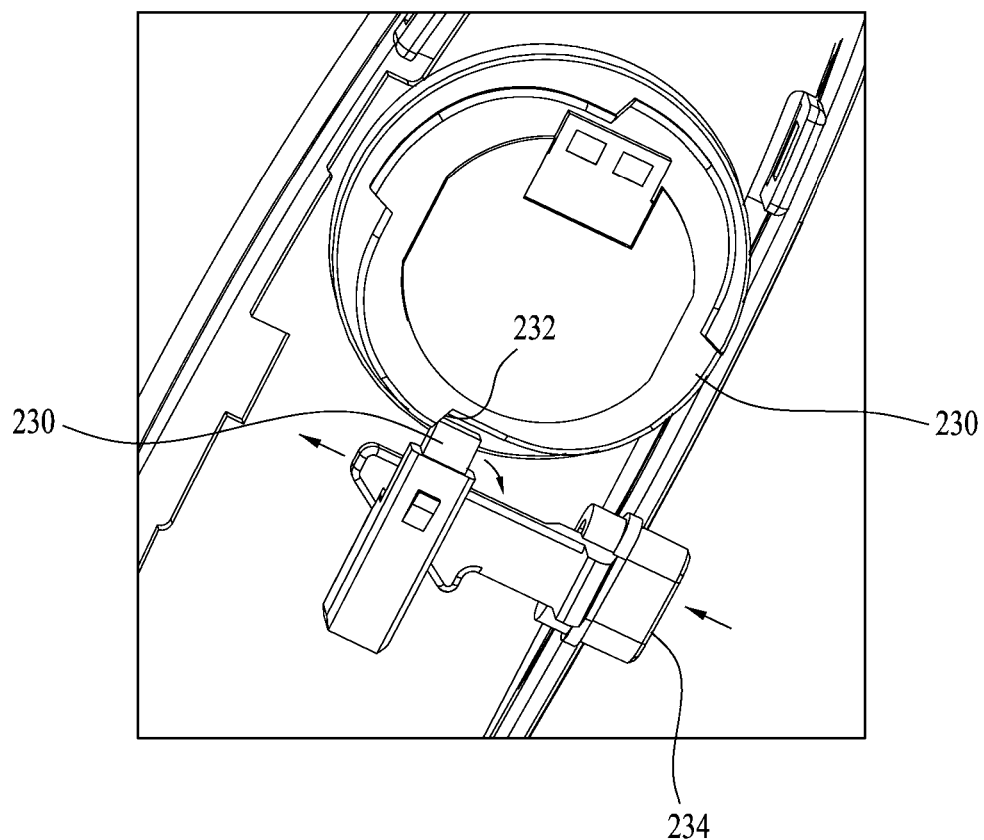
FIG. 11 is a sectional diagram illustrating a rotary member and a reel of a wireless sound equipment according to another embodiment of the disclosure.

FIG. 10 is a sectional diagram illustrating the reel 230 and the stopper 233 provided in the wireless sound equipment according to one embodiment of the disclosure. FIG. 11 is a sectional diagram illustrating a reel 230 and a stopper 233 provided in a wireless sound equipment 200 according to another embodiment of the disclosure. In FIG. 11 are shown a projection 231, a spiral spring 235 and a stopper 233.

The projection 231 may be formed linear in a direction in which it is rotated by the spiral spring 235 and gently curved in the reverse direction. The stopper 233 keeps a state of being pushed toward the reel 230 by a flexible member 233' applying a force to a center of the reel 230. Also, the stopper 233 supports the linear portion of the projection 231 and prevents the rotation of the reel 230.

When the user pushes the stopper 233 in a direction in which the stopper 233 is spaced apart from the reel 230, the coupling between the stopper 233 and the projection 231 is released and the reel 230 is rotated by the elastic force of the spiral spring 235. When the force applied to the stopper 233 by the user is removed, the stopper 233 is re-moved toward the reel 230 by the elastic force of the flexile member 233' toward the reel 230.

To allow the user to move the stopper 233 in the reverse direction of the elastic force of the flexible member 233', the stopper 233 may be connected to a receiver holding key 234 exposed to a surface of the housing 220 as shown in FIG. 7. The receiver holding key 234 may be operated in at least one of a sliding method (see FIG. 10) and a pressing method (see FIGS. 11 and 12).

Figure 12:
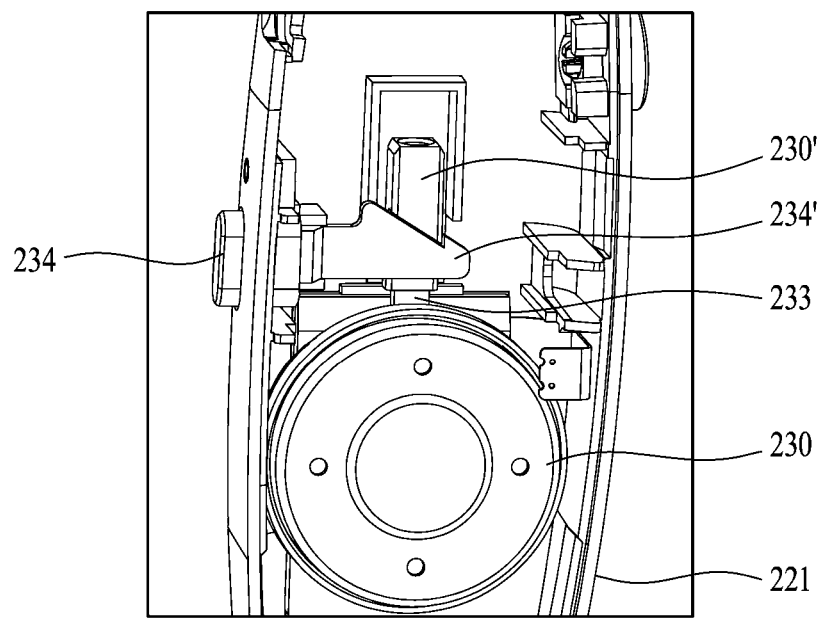
FIG. 12 is a diagram illustrating an operation of a receiver holding key shown in FIG. 11.
Figure 12:
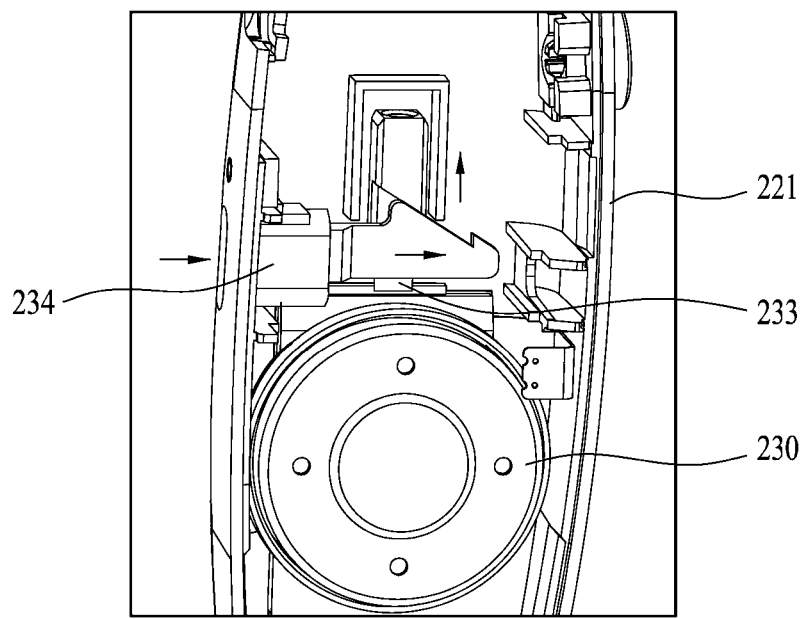

FIG. 12 is a diagram to describe the operation of the receiver holding key 234 shown in FIG. 11. In a state of (a), the stopper 233 is pushed and spaced apart from the reel 230, when the user presses the holding key 234. The stopper 233 is decoupled from the projection 232 formed in a circumference of the reel 230 and the reel 230 is rotated.

An audio substrate 236 is located under the reel 230 to transmit the audio signal transmitted via the flexible printed circuit board 253 to the audio cable 245. An audio brush 237 may be provided between the audio substrate 236 and the audio cable 245 to make the audio substrate 236 be connected with the audio cable 245, regardless of the location of the end of the audio cable 245 which is changed in the rotation of the reel 230.

The audio substrate 236 includes circular connecting terminals 236' and 236" having a different radius based on a type of a signal. The audio brush 237 moves over the circular connecting terminals 236' and 236" of the audio substrate 236, to keep the connection between the audio cable 245 and the audio substrate 236.

A noise blocking layer may be further provided to block the noise generated by the rotation of the reel 230 from coming out. A gear 232' shown in FIG. 7 may be further provided to rotate the reel 230 smoothly. Sawteeth 232 are formed in an outer circumferential surface of the reel 230 to engage with the gear 232'. When the sawteeth 232 engage with the gear 232' to rotate, the rotation speed of the gear 232' may be controlled and the rotation speed of the reel 230 may be also controlled.

Figure 13:
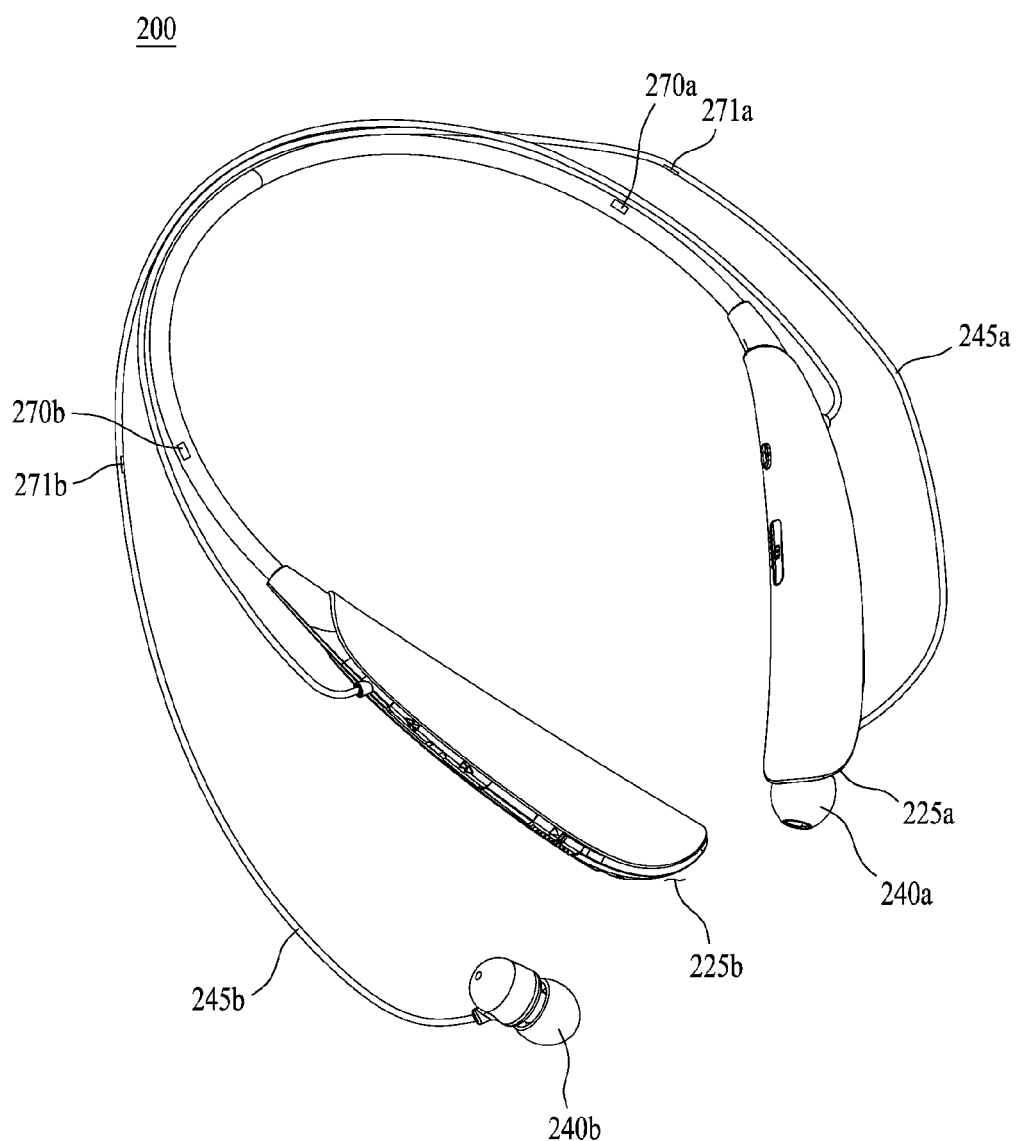
FIG. 13 is a perspective diagram illustrating a wireless sound equipment according to a further embodiment of the disclosure.

FIG. 13 is a diagram illustrating a wireless sound equipment 200 according to another embodiment of the disclosure. In this embodiment, audio cables 245a and 245b are not inserted in the housing 220 but winding around a back side of the user's neck along a band 210. Magnets 270a, 270b, 271a and 271b may be provided in the audio cables 245a and 245b and the band 210, respectively, to couple the audio cables to the band 210 easily.

When the band 210 is worn on the user's neck, the magnets 270a and 270b may be located under the user's ears and magnets 271a and 271b are provided in positions corresponding to the magnets 270a and 270b of the band of the audio cables 245a and 245b.

A receiver 240a provided in an end of the audio cable 245a extended from a left direction to a right direction along the band 210 may be coupled to a receiver holder 225a located in a right portion. In contrast, a receiver 240b provided in an end of the audio cable 245b extended from a right direction to a left direction is coupled to a receiver holder 225b located in a left portion.

At this time, a magnet 271a of the audio cable 245a extended from the left portion may be coupled to a left magnet 270a and a magnet of the audio cable 245b extended from a right portion may be coupled to a right magnet 270b.

Figure 14:
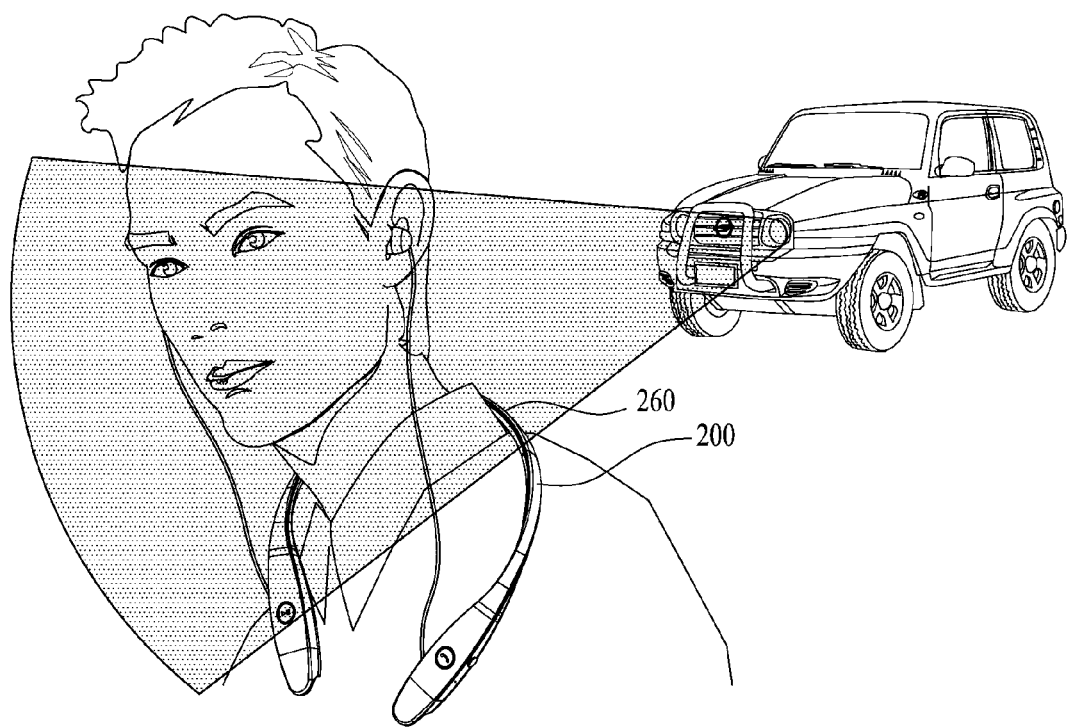
FIG. 14 is a diagram illustrating use of a wireless sound equipment according to one embodiment of the disclosure.

FIG. 14 is a diagram illustrating an illuminance sensor 260 which senses change in luminance to output a warning sound. The illuminance sensor 260 is a sensor for sensing light. Using the illuminance sensor 260, change in illuminance nearby can be sensed.

While listening to the music, with the receiver 240 put on the ear, it cannot be sensed that a vehicle is approaching which results in an accident. Especially, people cannot be seen well at night and a view of a vehicle is deteriorated such that the chances of getting into an accident can be increased.

When the illuminance sensor 260 senses that drastic change in illuminance which is generated by a light of a vehicle approaching to the wireless sound equipment, the controller may output a warning sound to the user through the receiver 240 or give vibration of the wireless sound equipment 200 to the user, using the vibrator motor.

When a reference value or more of illuminance change is generated within a preset time period (a short time period such as 0.5 second), it can be determined that a vehicle is approaching. Except that the user putting the receiver 240 on the ears is listening to the music, it is not necessary to output a warning sound through the receiver 240. Only when the receiver 240 is decoupled from the receiver holder 225, the warning sound can be controlled to be output.

As mentioned above, the warning function is provided only to prevent the accident caused by the user's failure to sense the vehicle approaching to the wireless sound equipment put on the user.

Also, the structure for the user to hold the receiver in the receiver holder easily may be provided such that the receiver can be carried simply and advantageously.

Figure 15:
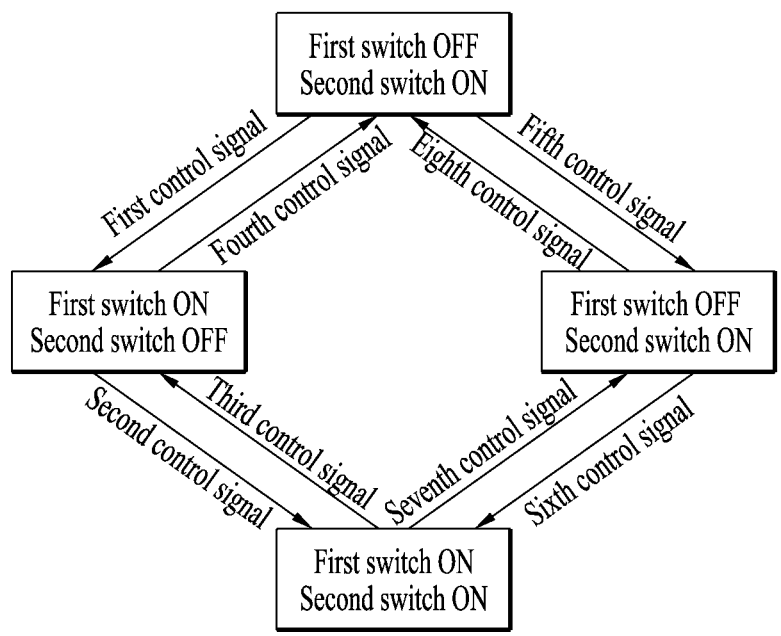
FIG. 15 is a diagram illustrating a control signal generated in accordance with ON/OFF state change of a switch provided in a wireless sound equipment according to a still further embodiment of the disclosure.

FIG. 15 is a diagram illustrating a control signal generated in accordance with change into ON/OFF state of a switch 226 provided in a wireless sound equipment 200 according to a further embodiment of the disclosure. When the switch 226 is changed into an OFF state from an ON state or into an OFF state from an ON state, the control signal is generated.

A first switch 226a may be set in a predetermined portion where a first button 223a having a function related with calling is located and a second switch 226b may be set in a predetermined portion where a first button 223b related with multimedia playing. For convenient explanation, the wireless sound equipment 200 has a left portion having a function related with calling and a right portion having a function related with music, when the user wears the wireless sound equipment 200 on the neck. The first switch 226a and the second switch 226b may be located in the reverse positions.

The receiver holder 225 having the first switch 226a located therein may be the first receiver 240a and the receiver 240 coupled to the first receiver holder 225a may be a second receiver holder 225b. The receiver holder 225 where the second switch 226b is located is a second receiver holder 225b and the receiver 240 coupled to the second receiver holder 225b is a second receiver 240.

A first control signal through an eighth control signal may be generated in accordance with change into an ON state from an OFF state of the first and second switches 226b.

Figure 16:
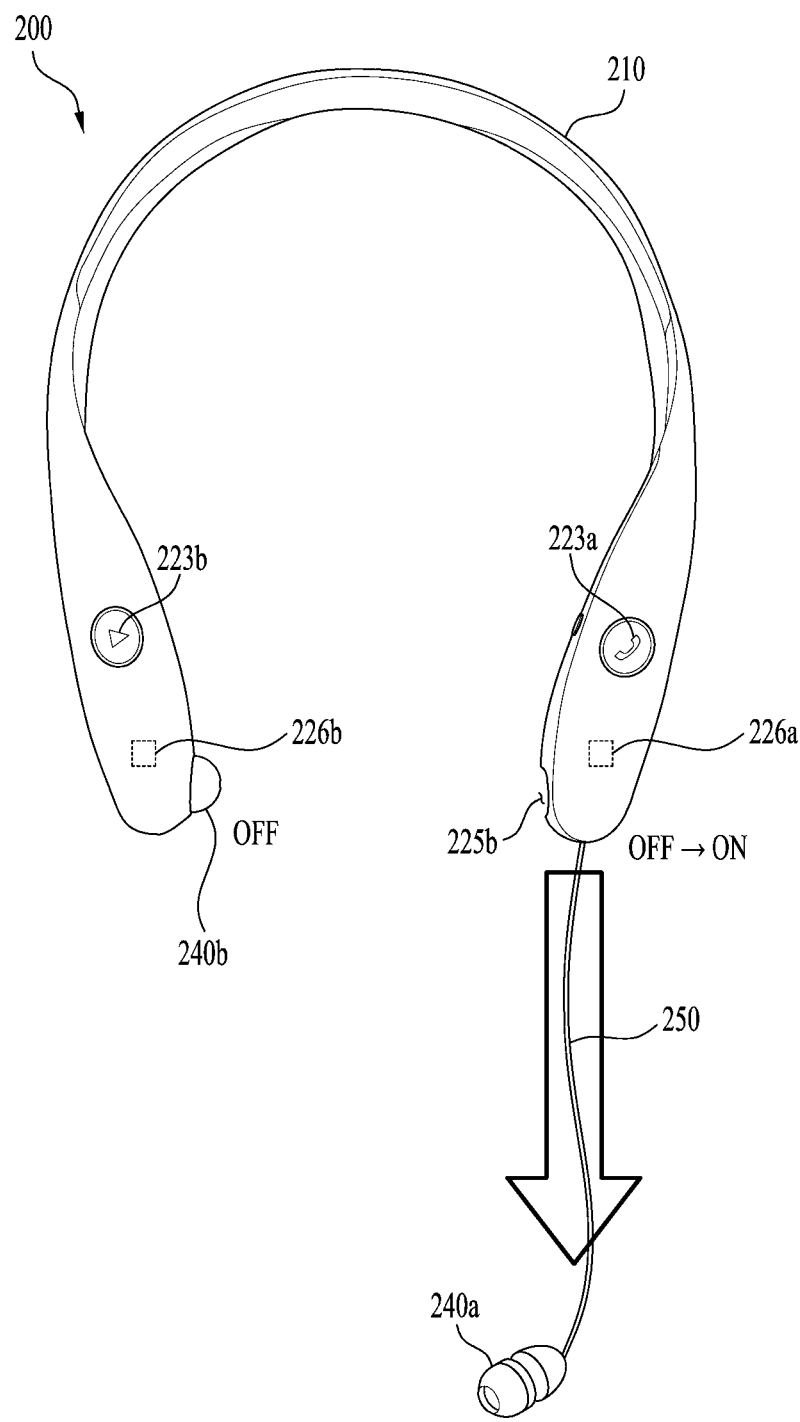
FIG. 16 is a diagram illustrating a wireless sound equipment according to a still further embodiment of the disclosure, when a first switch is changed into an ON state, with a second switch which is an OFF state.

FIG. 16 is a diagram illustrating the wireless sound equipment 200 according to the embodiment when the first switch 226a is changed into an ON state, with the second switch 226b in an OFF state. At this time, the controller generates a first control signal and the first control signal may include a command for implementing a function related with calling.

Figure 17:
FIGS. 17 through 19 are diagrams illustrating control of a terminal based on a first control signal of a wireless sound equipment according to a still further embodiment of the disclosure.
Figure 18:
Figure 18:
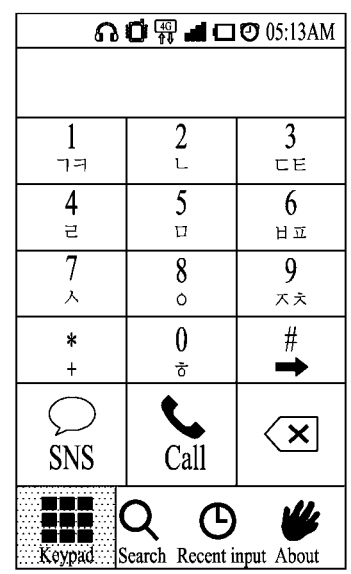
Figure 19:
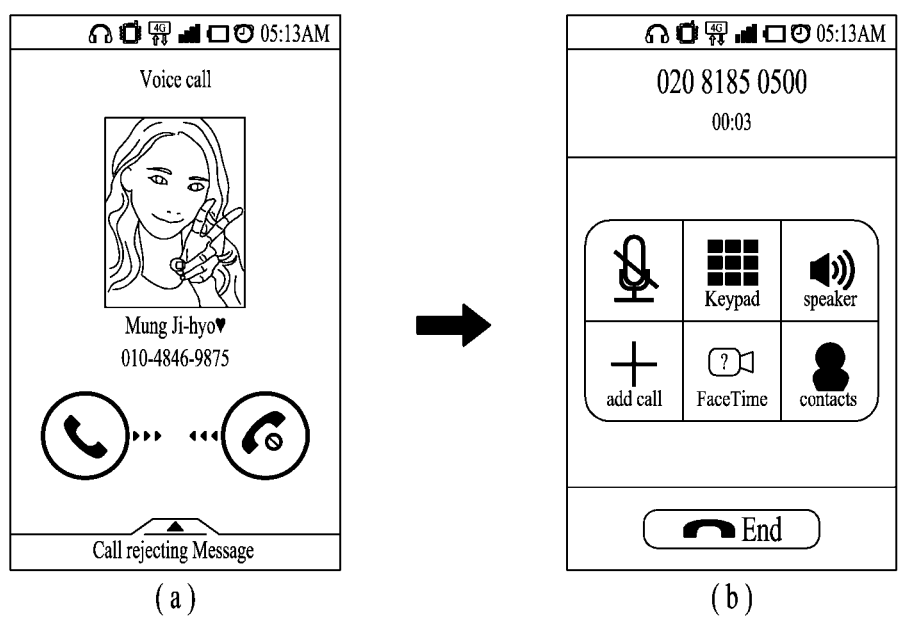

FIGS. 17 through 19 are diagrams to describe control of a terminal based on a first control signal of a wireless sound equipment 200. An address book may be implemented as shown in FIG. 9 and a keypad for inputting telephone numbers may be provided in a display of the terminal.

When calling a call signal as shown in FIG. 19, the user pulls and separates the first receiver 240a from the first receiver holder 225a, the first control signal is generated and a call is connected.

Figure 20:
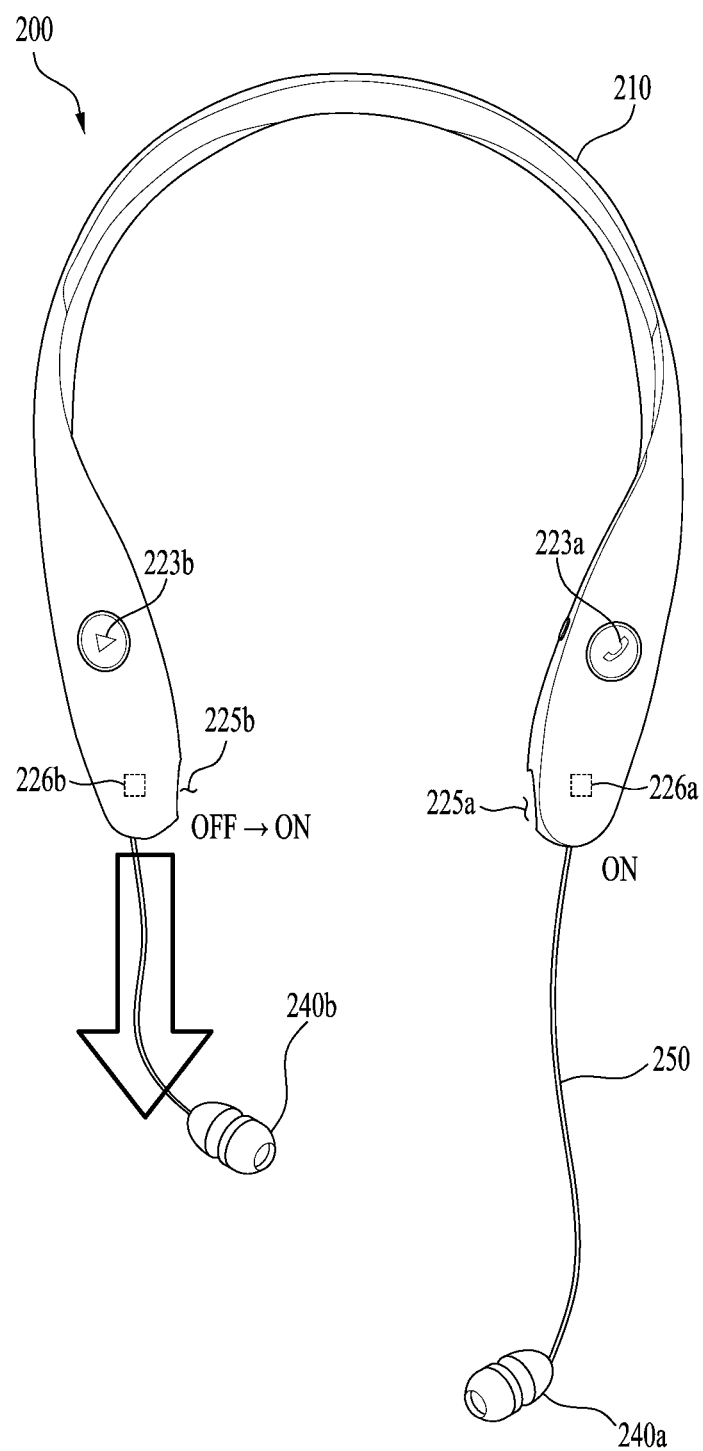
FIG. 20 is a diagram illustrating a wireless sound equipment according to a still further embodiment of the disclosure, when a second switch is changed into an ON state, with a first switch which is in an ON state.
Figure 21:
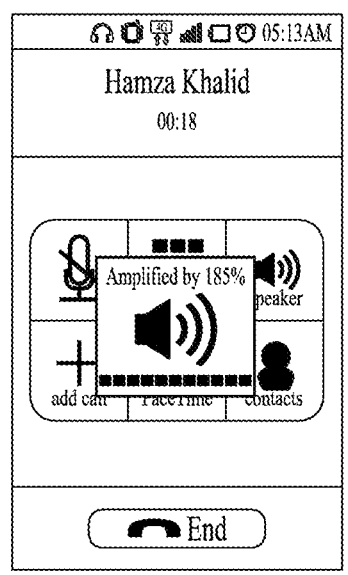
FIG. 21 is a diagram illustrating control of a terminal based on a second control signal and a third control signal.

FIG. 20 is a diagram illustrating the wireless sound equipment 200 according to the embodiment of the disclosure when the second switch 226b is changed into the ON state, with the first switch 226a in the ON state. FIG. 21 is a diagram to describe the control of the terminal based on a second control signal and a third control signal.

When talking on the phone, with the first receiver 240a put on the ears, the user separates the second receiver 240b from the second receiver holder 225b, only to increase an audio volume of the mobile terminal. In contrast, when the second receiver 240b is coupled to the second receiver holder 225b, the sound volume is increased.

At this time, the audio volume can be controlled gradually, using a rotational number of the reel 230. In other words, the audio volume can be controlled based on the length of the second receiver 240b separated and pulled from the second receiver holder 225b.

Figure 22:
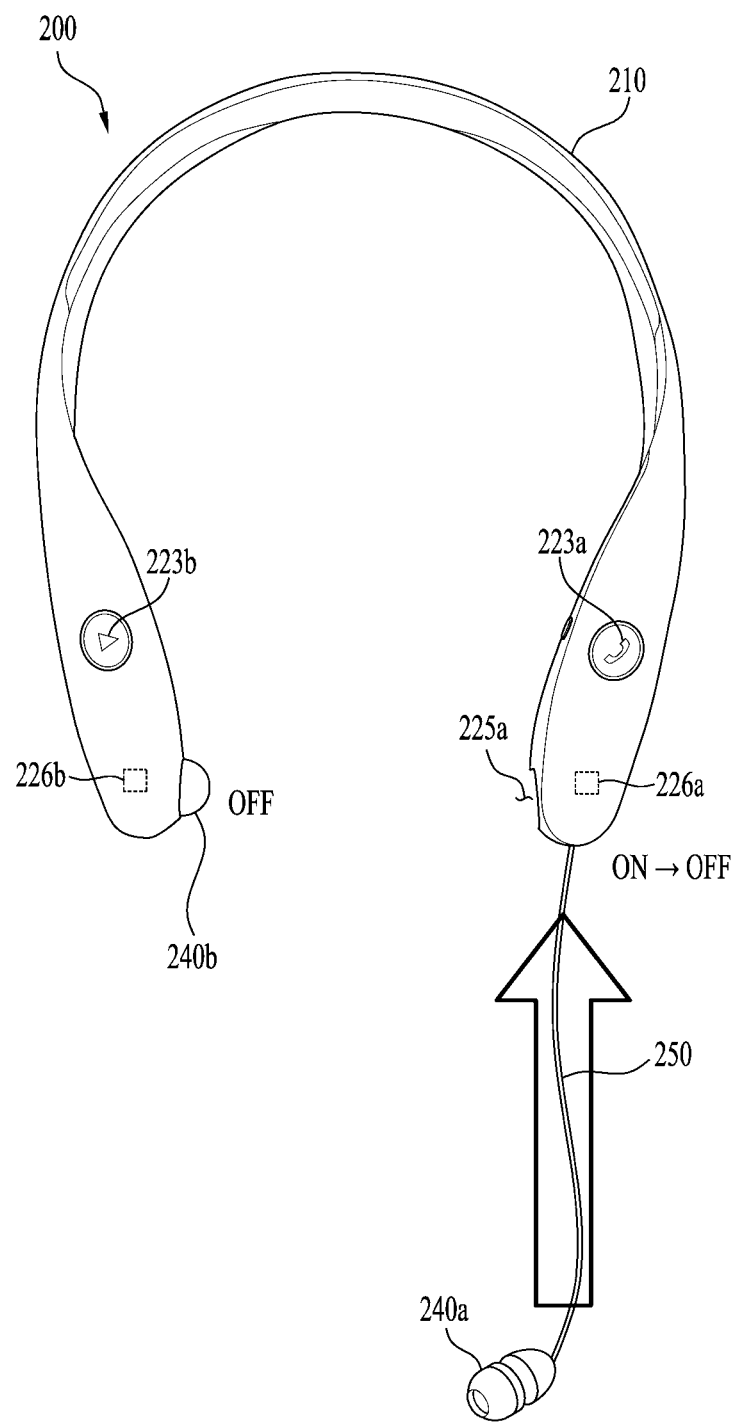
FIG. 22 is a diagram illustrating a wireless sound equipment according to a still further embodiment of the disclosure, when a second switch is changed into an ON state, with a second switch which is in an OFF state.
Figure 23:
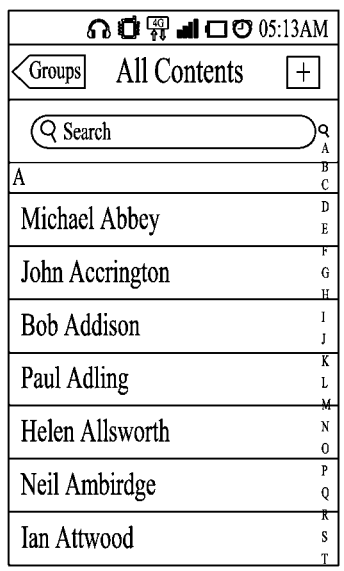
FIGS. 23 and 24 are diagrams illustrating control of a terminal based on a fourth control signal.
Figure 23:
Figure 24:
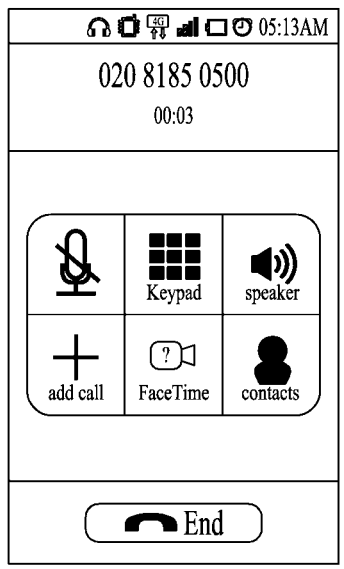
Figure 24:
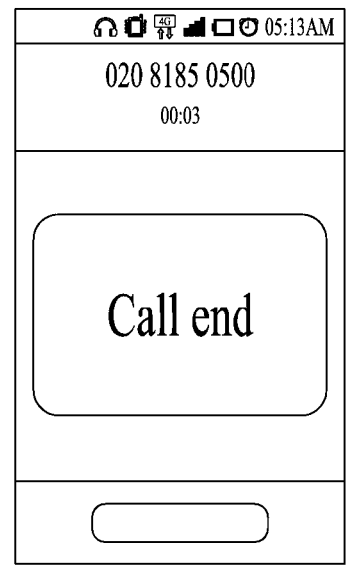

FIG. 22 is a diagram illustrating the wireless sound equipment 200 according to the embodiment, when the first switch 226a is changed into the OFF state, with the second switch 226b in the OFF state. FIGS. 23 and 24 are diagrams to describe control of the terminal based on a fourth control signal.

When the first receiver 240a is coupled to the first receiver holder 225a in a state where the second receiver 240b is inserted in the second receiver holder 225b (in a state where the second switch 226b is OFF), the first switch 226a is changed into the OFF state and a fourth control signal is generated.

At this time, the fourth control signal may include a control command for ending the function activated by the first control signal. In other words, as shown in FIG. 23, the fourth control signal may ends the call application, the address book which is activated by the first control signal and change the current screen into a home screen. As shown in FIG. 24, the fourth control signal may end the calling.

When the first receiver 240a is coupled to the first receiver holder 225a in a state where the second receiver 240b is decoupled, not coupled to the second receiver holder 225b, a seventh control signal is generated. While the terminal is implementing a function based on the first control signal, the first switch 226a is changed into the OFF state, with the second switch 226b in the ON state, and the seventh control signal is then generated. Once the seventh control signal is generated, the seventh control signal may end the function activated by the first control signal, similar to the fourth control signal.

Figure 25:
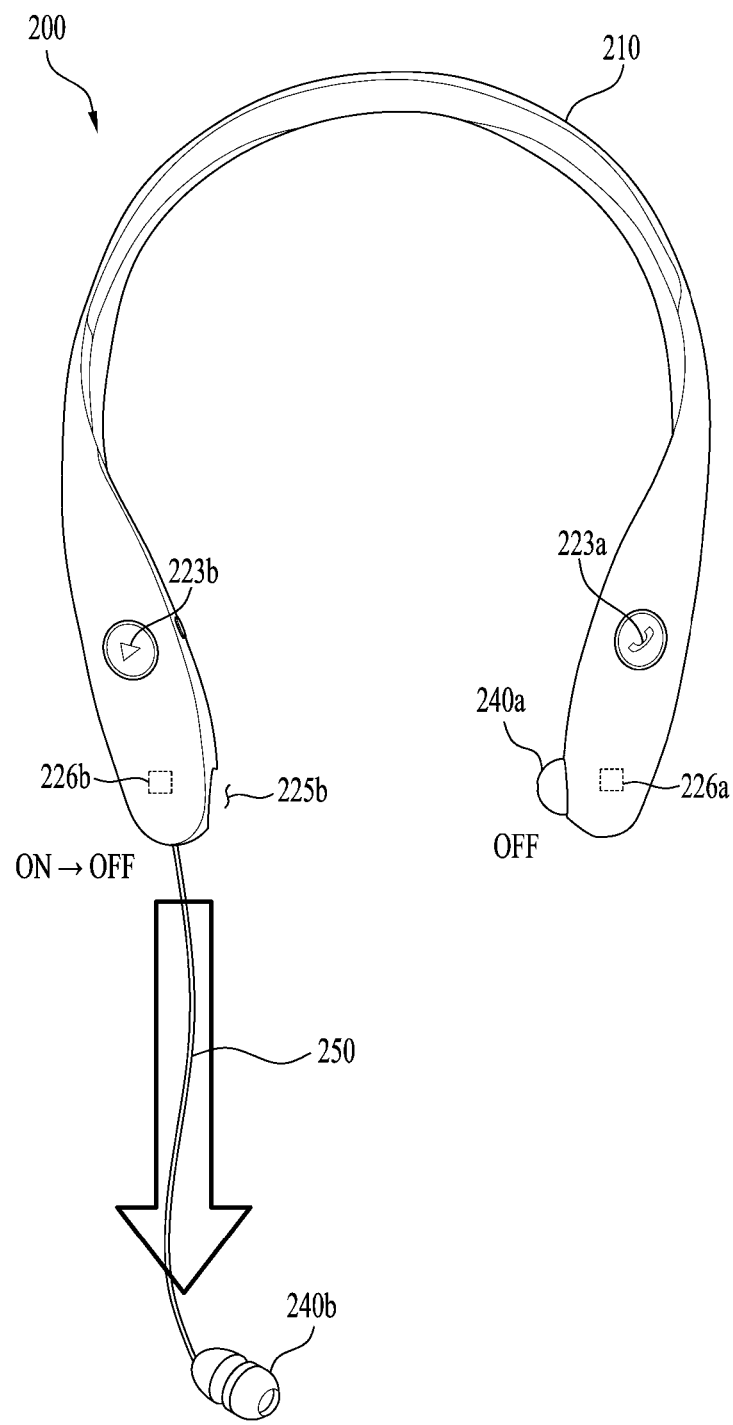
FIG. 25 is a diagram illustrating a wireless sound equipment according to a still further embodiment of the disclosure, when a second switch is changed into an ON state, with a first switch which is in an OFF state.
Figure 26:
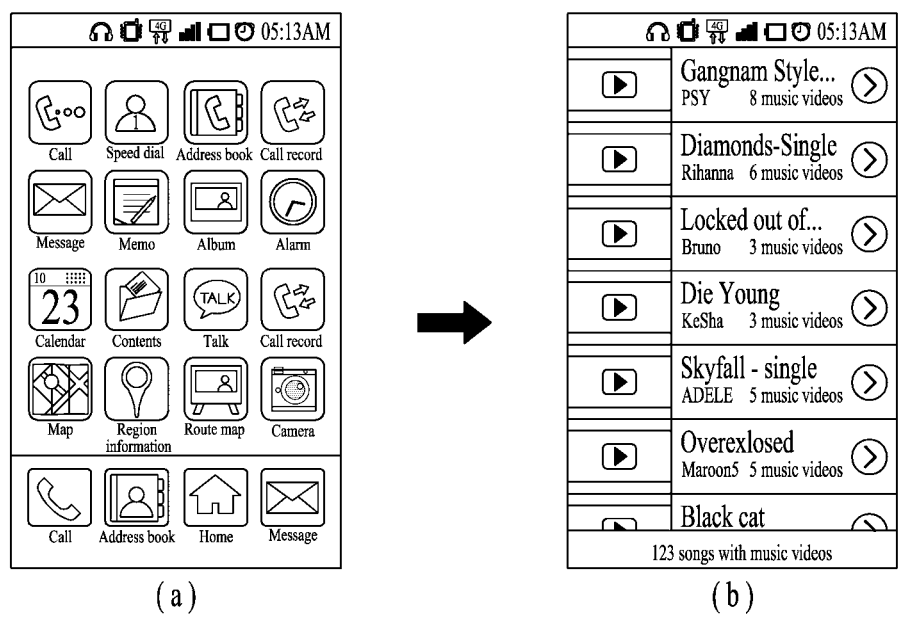
FIG. 26 is a diagram illustrating control of a terminal based on a fifth control signal.

FIG. 25 is a diagram illustrating the wireless sound equipment 200 according to the embodiment of the disclosure, when the second switch 226b is changed into an ON state with the first switch 226a in an OFF state. FIG. 26 is a diagram to describe control of the terminal based on a fifth control signal.

When the second receiver 240b is decoupled from the second receiver holder 225b in a state where the first receiver 240a is inserted in the first receiver holder 225a (a state where the first switch 226a is in an OFF state), the second switch 226b is changed in to an ON state and a fifth control signal is generated.

Figure 27:
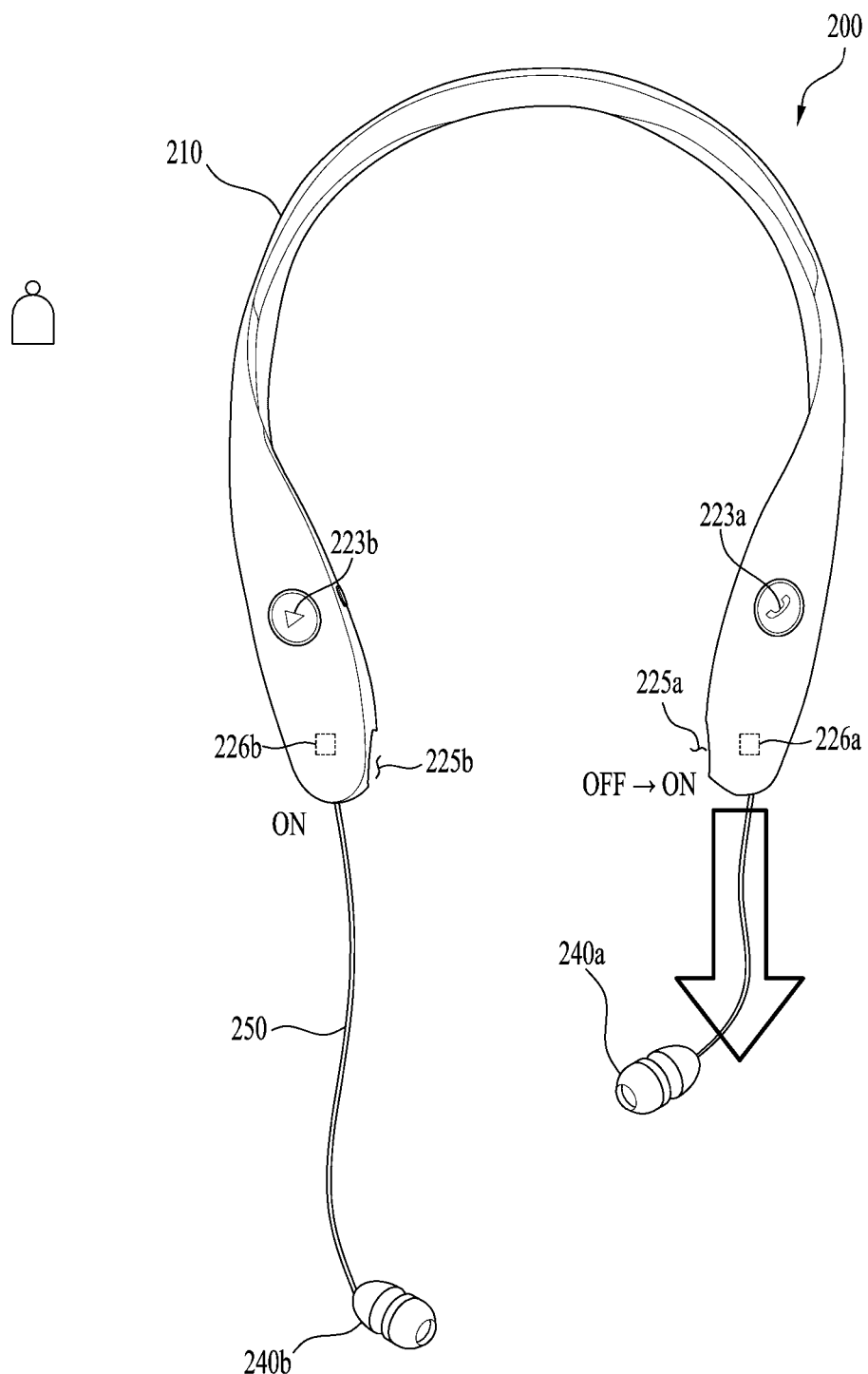
FIG. 27 is a diagram illustrating a wireless sound equipment according to a still further embodiment of the disclosure, when a first switch is changed into an ON state, with a second switch which is in an OFF state.

The fifth control signal implements a function related with multimedia file playing. As shown in FIG. 27, a multimedia function is implemented and a list of multimedia files is displayed on the display of the terminal.

Figure 28:
FIG. 28 is a diagram illustrating control of a terminal based on a sixth control signal.
Figure 28:
Figure 28:
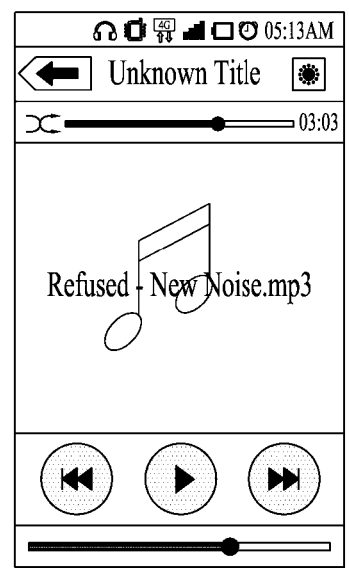

FIG. 27 is a diagram illustrating the wireless sound equipment 200 according to the embodiment of the disclosure, when the first switch 226a is changed into an ON state, with the second switch 226b in an ON state. FIG. 28 is a diagram to describe control of the terminal performed by a sixth control signal.

When the first receiver 240a is coupled to the first receiver holder 225a in a state where the second receiver 240b is decoupled from the second receiver holder 225b (in a state where the second switch 226b is in an ON state), the first switch 226a is changed into an ON state and a sixth control signal is generated. The sixth control signal includes a control command for playing one of the multimedia files.

When the first switch 226a is changed into an OFF state, with the second switch 226b in an ON state, a seventh control signal is generated. In this instance, the playing music can be ended. In other words, the seventh control signal may perform the reverse function of the function implemented by the sixth control signal.

Figure 29:
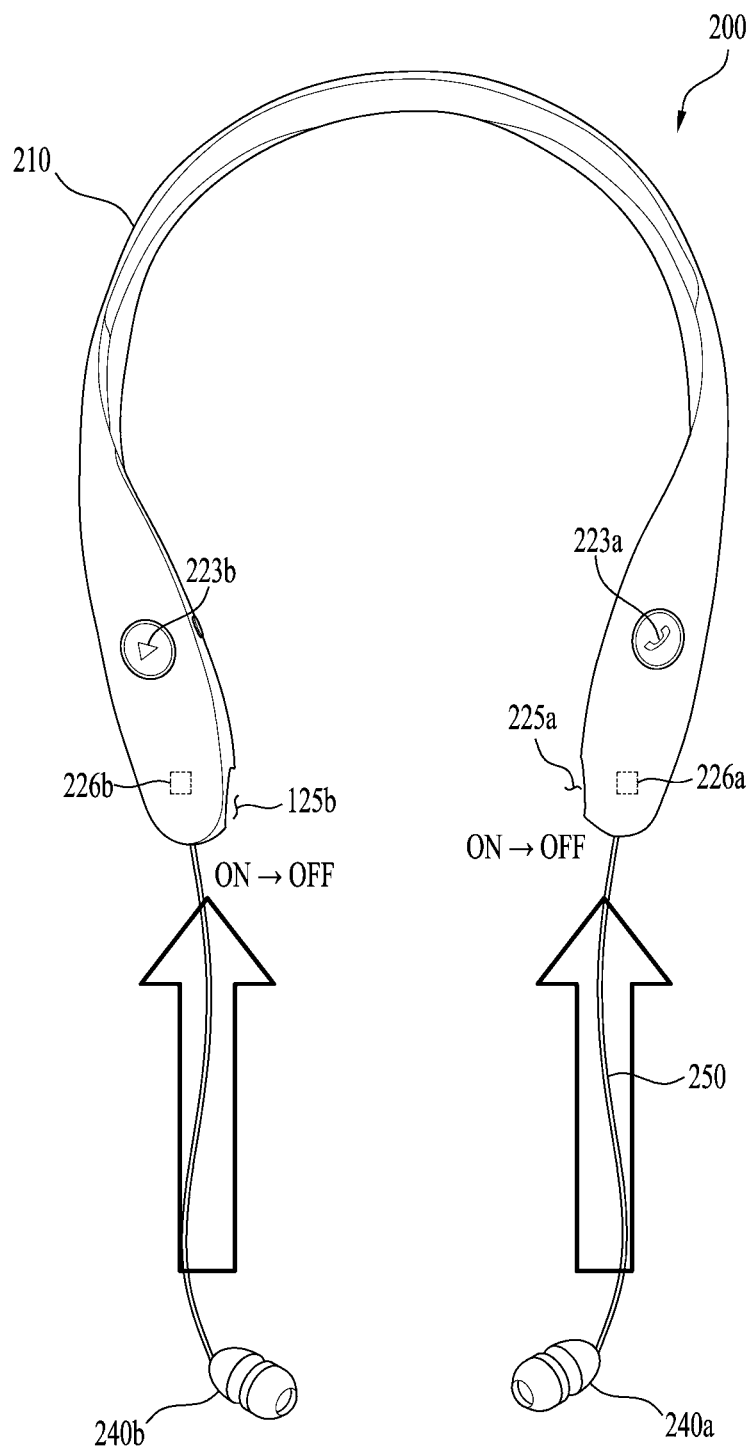
FIG. 29 is a diagram illustrating a wireless sound equipment according to a still further embodiment of the disclosure, when a first switch is changed into an ON state, with a second switch which is in an OFF state.
Figure 30:
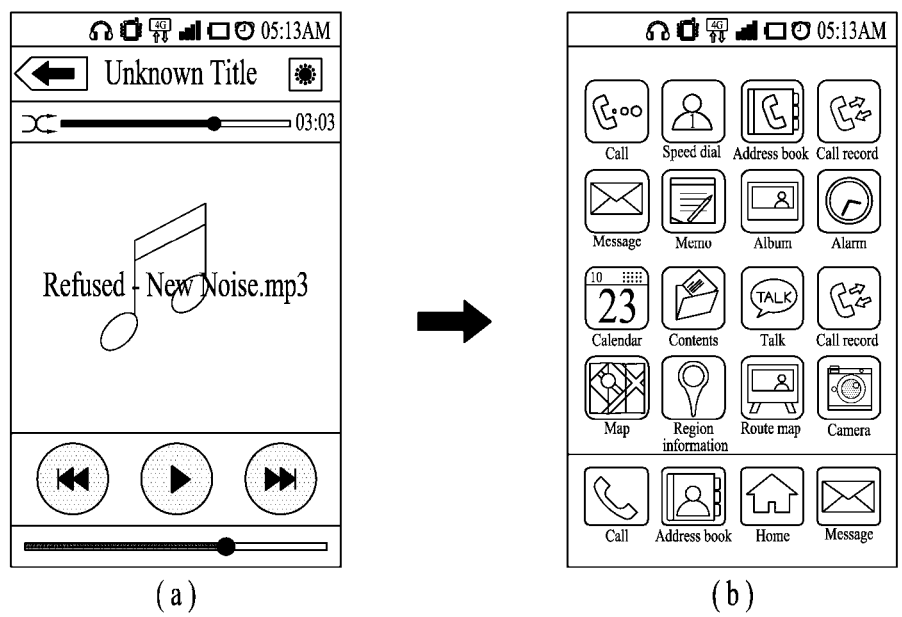
FIG. 30 is a diagram illustrating control of a terminal based on an eighth control signal.

FIG. 29 is a diagram illustrating the wireless sound equipment 200 according to the embodiment of the disclosure, when the second switch 226b is changed into an OFF state, with the first switch 226a in an OFF state. FIG. 30 is a diagram to describe control of the terminal performed by an eighth control signal.

When the second receiver 240b is coupled to the second receiver holder 225b in a state where the first receiver 240a is inserted in the first receiver holder 225a, the second switch 226b is changed in to an OFF state and an eighth control signal is generated. The eighth control signal may implement the reverse function of the function the fifth control signal implements. The eighth control signal may end the multimedia application started by the fifth control signal.

When the second switch 226b is playing a multimedia file, with the first switch in an ON state and the second switch 226b in an ON state, the second receiver 240b is coupled to the second receiver holder 225b first and a third control signal is generated. After that, the first receiver 240a is coupled to the first receiver holder 225a and a fourth control signal is generated.

During the call, the third control signal may include a command for controlling an audio volume and the fourth control signal ends the calling. However, the third control signal generated during the multimedia file playing may include a command for ending the playing music and the fourth control signal may include a command for ending the multimedia application.

Moreover, the wireless sound equipment 200 may couple or decouple the receiver 240 to or from the receiver holder 225, only to control the terminal. After the receiver 240 is decoupled and put on the user' ears, an additional operation of the terminal or pressing of the button provided in the wireless sound equipment 200 can be omitted.

Figure 31:
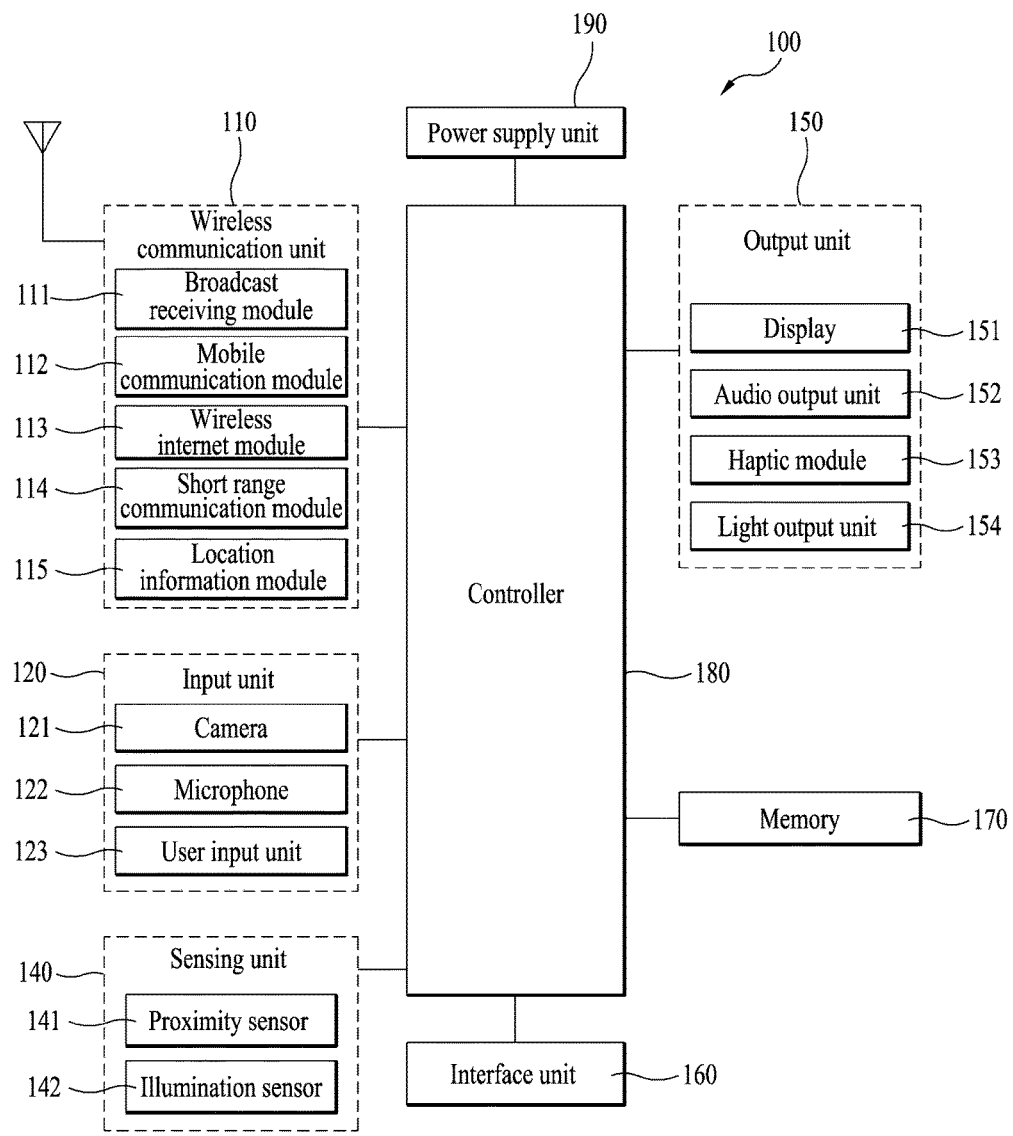
FIG. 31 is a diagram illustrating a mobile terminal according to one embodiment of the disclosure.

Reference is now made to FIG. 31, where FIG. 31 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 31, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 31, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 31, or activating application programs stored in the memory 170. As one example, the controller 180 controls some or all of the components illustrated in FIG. 31 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

At this time, examples of another mobile terminal 100 may include wearable devices 210, 220, 230 and 240 (e.g., smart watches, smart glasses and head mounted displays) which can exchange data with the mobile terminal 100 (or which can be connectable with the mobile terminal 100). The short range communication module 114 may sense (or recognize) wearable deices communicable with the mobile terminal nearby. Moreover, when it is determined that the sensed wearable device is an authentic device for communicating with the mobile terminal 100, the controller 180 may transmit at least some of the data processed in the mobile terminal 100 to the wearable devices through the short range communication module 114. Accordingly, the user of the wearable device may use the data processed in the mobile terminal 100 through the wearable device. For instance, the user may perform calling through the wearable device when the mobile terminal 100 receives a call or check the received message through the wearable device when the mobile terminal 100 receives a message.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 32:
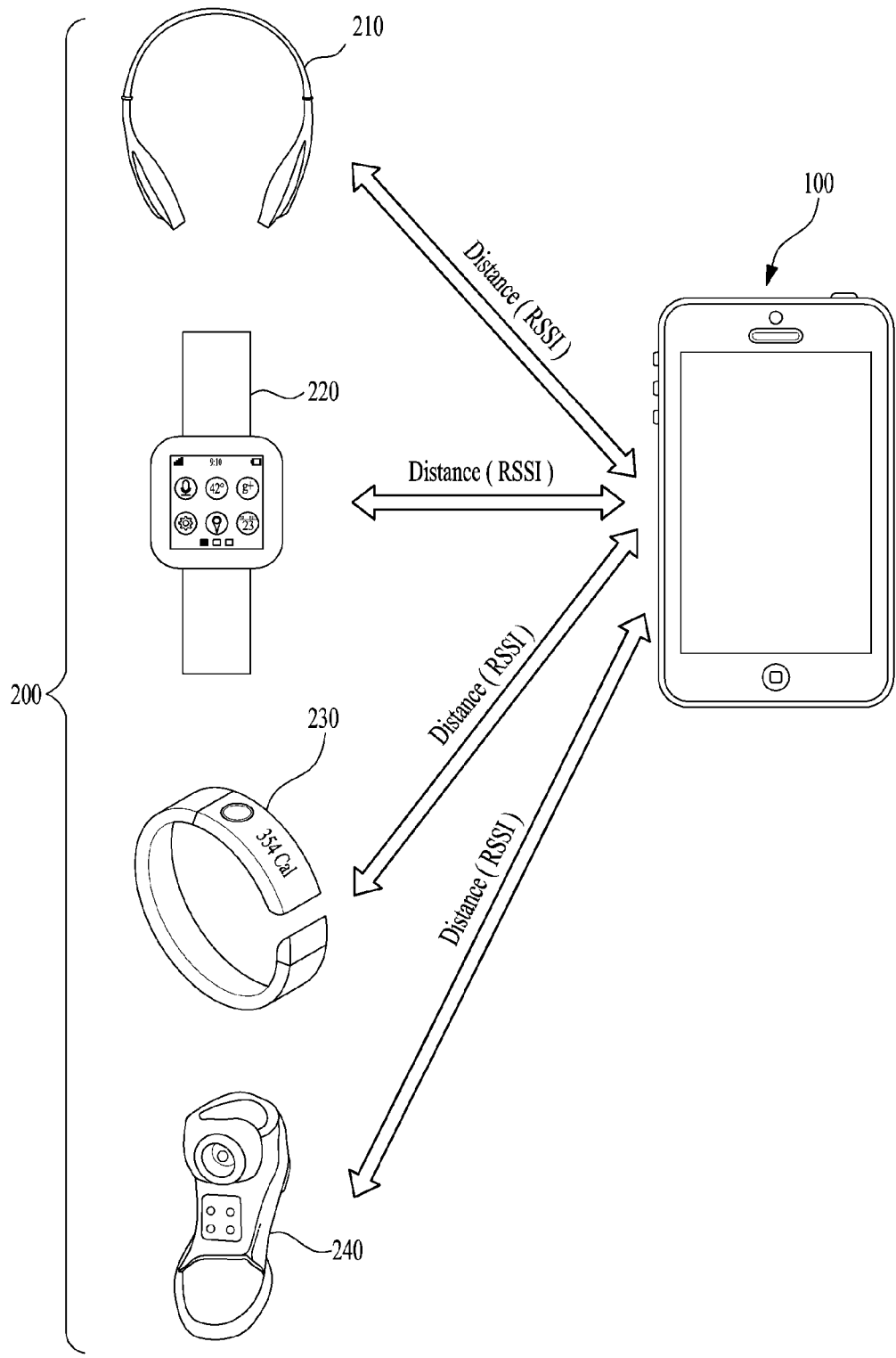
FIG. 32 is a diagram illustrating short range wireless communication of a mobile terminal according to one embodiment of the disclosure.

FIG. 32 is a diagram to describe short range wireless communication of the mobile terminal 100 according to one embodiment of the disclosure. The short range wireless communication may support short range communication, using at least one of BLUETOOTH™, RFID (Radio Frequency Identification), IrDA (Infrared Data Association), UWB (Ultra Wideband), ZegBee, NFC (Near Field Communication), Wi-Fi (Wireless-Fidelity), Wi-Fi Direct and Wireless USB (Wireless Universal Serial Bus).

BLUETOOTH is a typical short range wireless communication technical standard for connecting two hand-carry devices (e.g., mobile terminals, notebooks, earphones and headphones) to exchange information with each other and it is used when low power wireless connection is needed in an ultra-short range of 10~20 meters. BLUETOOTH is used for a wireless earphone, a wireless mouse, a smart watch 220 and the like.

BLUETOOTH uses 2400~2483.5 MHz which is ISM (Industrial Scientific and Medical) frequency band. To block interference of other systems using upper and lower frequencies, BLUETOOTH uses total 79 channels of 2402~2480 MHz except a range of 2 MHz higher than 2400 MHz and 3.5 MHz lower than 2483.5 MHz. ISM is a frequency band assigned for industrial, scientific and medical use and it is used in a personal wireless device which can emit low power electric waves, without permission to use electric waves. Amateur radio, wireless LAN and BLUETOOTH uses the ISM band.

BLUETOOTH uses the same frequency band with various systems and it is likely that interference might be caused between systems. To prevent the interference, BLUETOOTH uses frequency hopping. The frequency hopping is a method for transmitting a small quantity of a packet (or data) while hopping a number of channels along a specific pattern rapidly. BLUETOOTH hops the assigned 79 channels 1600 times per 1 second.

This hopping pattern has to be synchronized between BLUETOOTH devices to enable communication. BLUETOOTH devices are connected as a master and a slave. When a slave device fails to be synchronized to the frequency hopping generated by a master device, the communication between the two devices cannot be enabled. Accordingly, the two devices can be connected stably, without the interference of other systems. Several slave devices can be connected to one master device and the roles of the master and slave are not fixed such that the roles can be exchanged according to situations.

The external device 300 connected through short range wireless communication may be connected not only to the wearable devices 310, 320, 330 and 340 (e.g., a headset 310, a smart watch 320, a smart band 330, a smart glass and a smart shoe 340) but also to electric home appliances (e.g., a refrigerator, a washing machine, an air conditioner and a television) or vehicles (e.g., an automobile and a motorcycle).

The mobile terminal 100 may include a signal sensing unit for measuring RSSI (Received Signal Strength Indicator) of the signal for each of the external devices 300 after sensing the strength of the signal transmitted/received to/from the external device 300, only to recognize the distance with the external devices 300. When the strength of the signal is a preset value or more (a reference value of the signal strength or more), it is controlled that the mobile terminal 100 is connected and a specific function is implemented.

Figure 33:
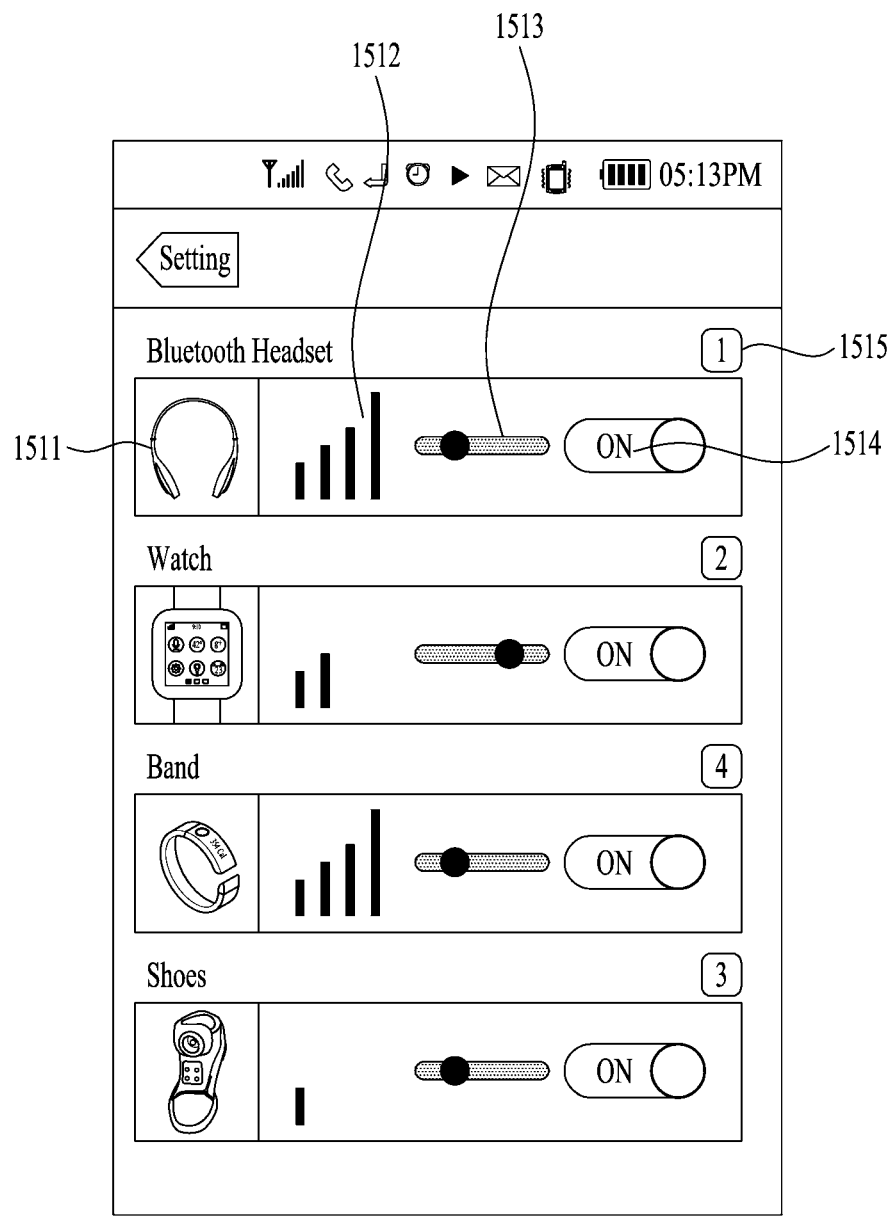
FIG. 33 is a diagram illustrating a screen for connecting a plurality of external devices of a mobile terminal according to one embodiment of the disclosure.

FIG. 33 is a diagram illustrating a screen for connecting the mobile terminal 100 according to this embodiment to a plurality of external devices 300. The plurality of the external devices 300 may be connected to one mobile terminal 100. The connected external devices 300 may be displayed (1511) and the signal strength of each external device 300 is displayed (1512).

An adjustment bar 1513 may be provided to adjust a reference signal strength such that the user can set the signal strength for each of the external devices 300. Alternatively, the user may set (1514) whether to connect a neighboring external device 300.

When the plurality of the external devices 300 connected to one mobile terminal 100 are operated, there might be collision between them. To prevent that, the external devices 300 may be prioritized (1515). The operation related with the external device 300 having the highest priority may be performed preferentially.

For instance, when the wireless headset 310 and the wireless speaker are connected simultaneously, the priority of the wireless headset 310 is higher than that of the wireless speaker and then a sound may be controlled to be output through the wireless headset 310.

Hereinafter, the control of the mobile terminal 100 will be described when the mobile terminal 100 is connected with the wearable devices 310, 320, 330 and 340 wirelessly. In case the external devices 300 are wearable devices 310, 320, 330 and 340 (e.g., a wireless headset 310, a smart watch 320), the wearable devices may keep a state of being always put on the user's body part.

However, the mobile terminal 100 may be carried with one hand and it may be distant from the user's body part. It may be determined that the mobile terminal 100 is spaced apart from the user based on a distance set by the strength of the wireless communication signal between the wearable devices 310, 320, 330 and 340 and the mobile terminal 100 and the mobile terminal 100 can be controlled based on the result of the determination.

Figure 34:
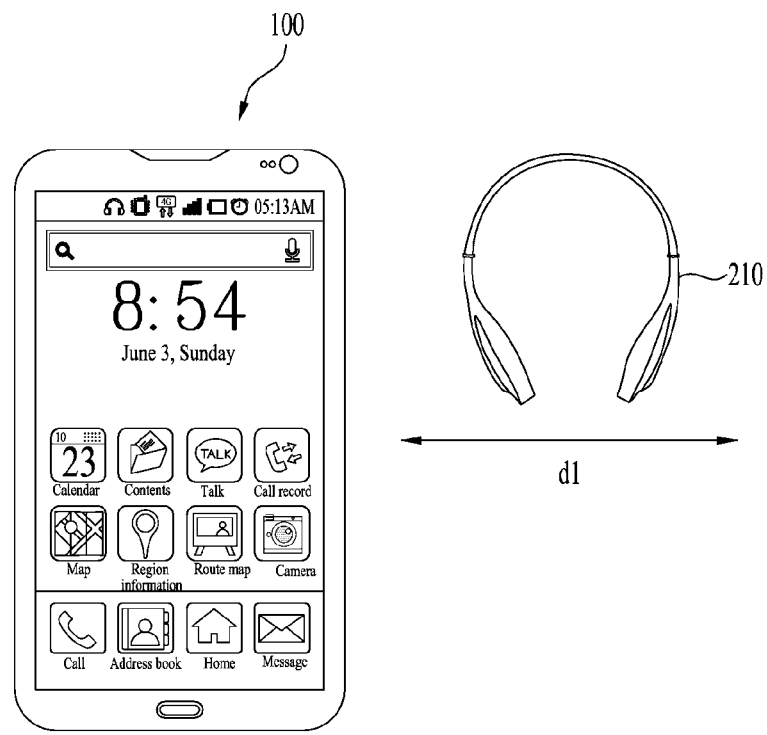
FIG. 34 is a diagram illustrating a mobile terminal when a wearable device is located within a first range.

More specifically, when the user approaches the mobile terminal 100 spaced apart from the user to be located within a first distance, it is determined that the user tries to uses the mobile terminal 100 and the locked state of the mobile terminal 100 may be unlocked (see FIG. 34).

The first distance may be set as a distance from each of the wearable devices 310, 320, 330 and 340 when the user holds the mobile terminal and it may be differently set based on a type of a wearable device 310, 320, 330 and 340. When the distance between the mobile terminal 100 and the smart watch 320 is 10 cm or less, a locked state of the mobile terminal 100 is unlocked. When a distance between the wireless headset 310 and the mobile terminal 100 is 50 cm or less, the locked state of the mobile terminal 100 may be unlocked.

When at least three of the wearable devices 310, 320, 330 and 340 are approaching to the mobile terminal within the first distance or less, the locked state of the mobile terminal 100 can be unlocked. Or, only when one wearable device 310, 320, 330 or 340 having the highest priority is approaching within a first distance or less, the locked state of the mobile terminal 100 can be unlocked.

Figure 35:
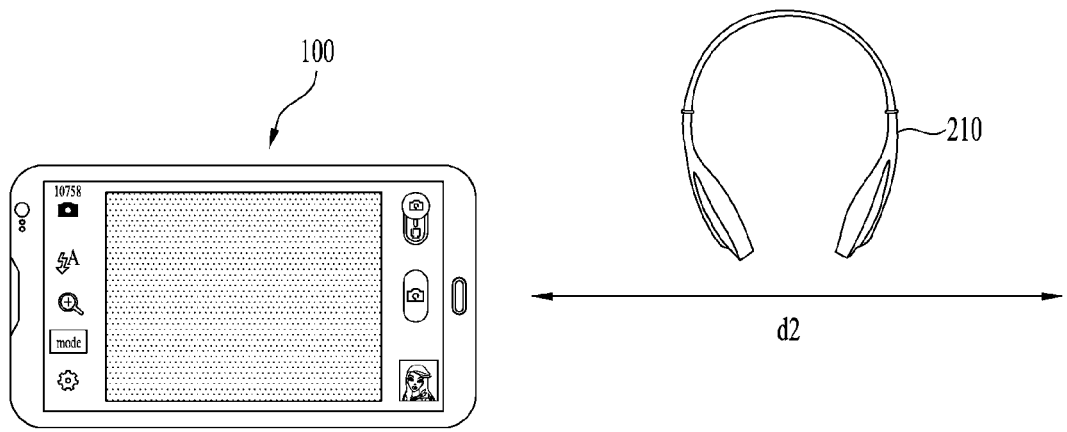
FIG. 35 is a diagram illustrating a mobile terminal when a wearable device is located within a second range farther than a first range.

FIG. 35 is a diagram illustrating the mobile terminal 100 when the wearable devices 310, 320, 330 and 340 are located within the first distance or more and the second distance or less. When the wearable devices are out of the first distance in the unlocked state, the mobile terminal 100 may not be locked immediately but only some functions need to be restricted. For instance, the mobile terminal can be handed over to the person next to the user to show photographs or video files and another person except the user may uses a photographing function.

In other words, the mobile terminal 100 is not changed into the locked state completely but only several functions are activated, to restrict the other functions except the application used currently. More specifically, when the camera application is used currently, the other applications cannot be used or the other photographs cannot be seen, except a photographing function and seeing photograph function.

When the implementing application provides one of document, photograph, and video files to the display 151, reading of the other files is restricted except the corresponding document, photograph and video file and the personal privacy can be protected. When an editing function rather than the reading function is provided, the editing and deleting functions may be restricted for another person except the user to delete and edit the files.

Figure 36:
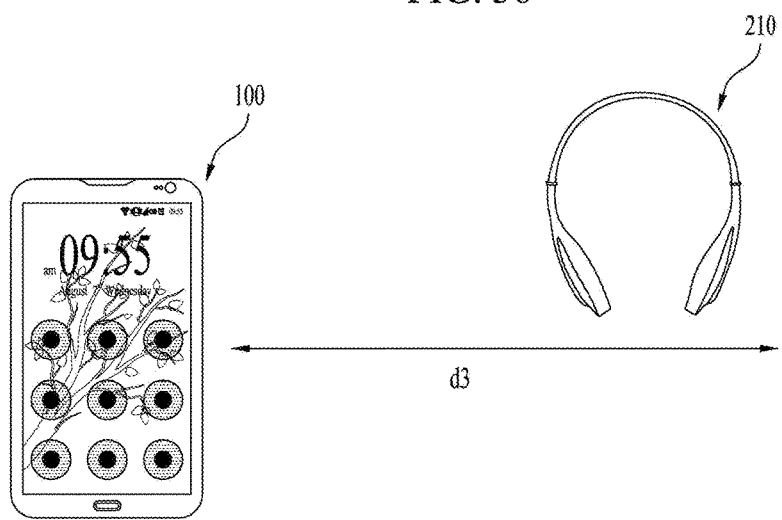
FIG. 36 is a diagram illustrating a mobile terminal when a wearable device is located within a third range farther than a second range.

When the distance is out of the second distance as shown in FIG. 36, it is determined that the mobile terminal is spaced apart a preset distance or more from the user and that it is not used by the user, such that the mobile terminal 100 may be changed into the locked state again. At this time, the unlocking of the locked state when the mobile terminal approaching within the first distance or less may be performed rapidly. it is preferred that the state of the mobile terminal is changed into the locked state in case the mobile terminal is out of the second distance for a preset time period or more.

Figure 37:
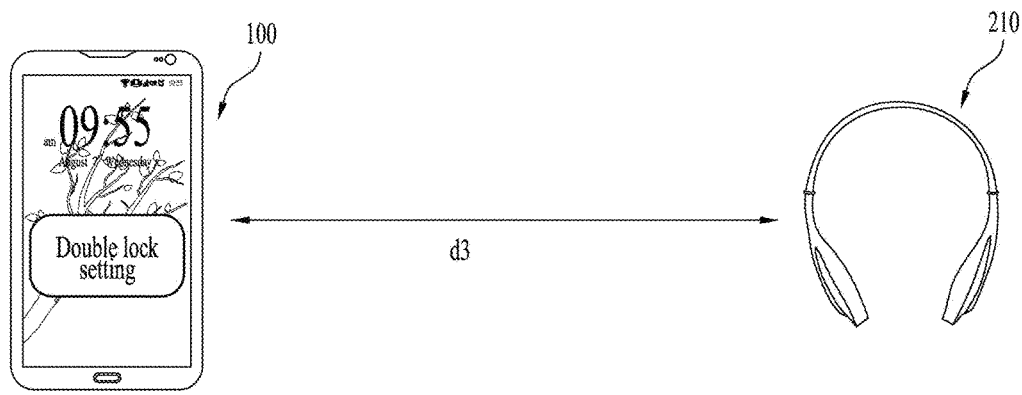
FIG. 37 is a diagram illustrating a mobile terminal when a wearable device is located farther than a third range.
Figure 38:
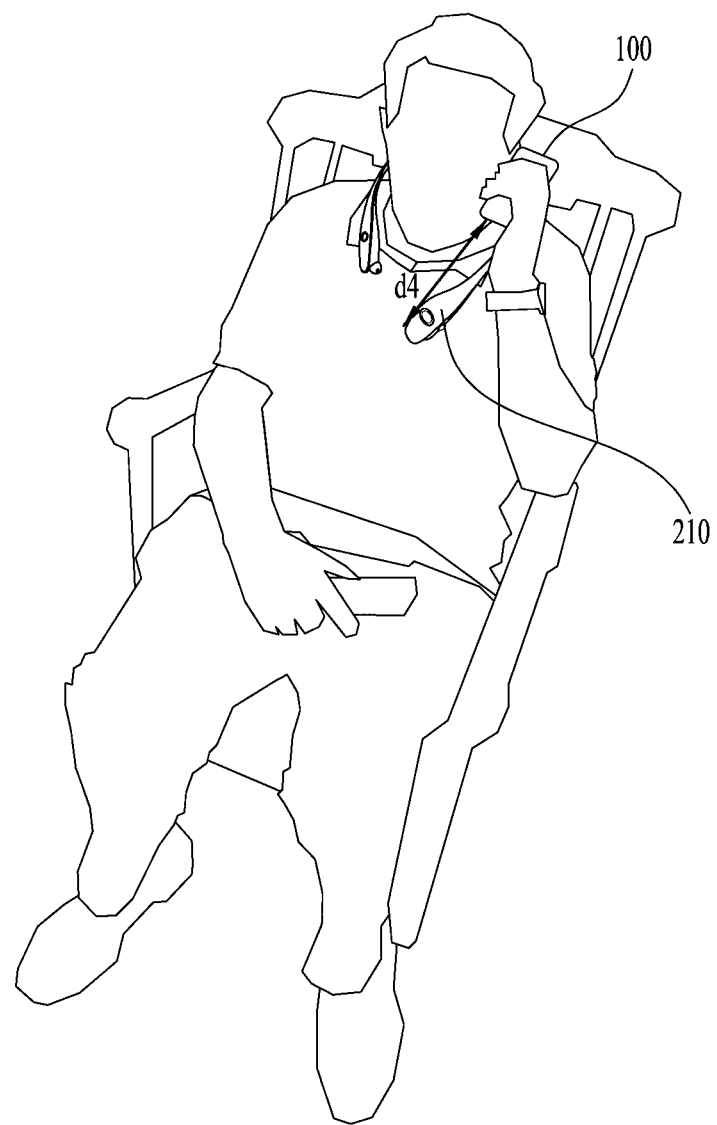
FIG. 38 is a diagram illustrating a mobile terminal when a wearable device is located within a fourth range

When the state of the mobile terminal spaced apart a third distance or more which is farther than the second distance is continuous for a preset time period, it may be determined that the user lost the mobile terminal 100. In other words, when the state of the mobile terminal spaced apart the third distance or more is continued for several hours or days, a double lock may be set to protect personal information (see FIG. 37).

In this instance, location information may be transmitted to the server or another terminal to allow the user to fine the location of the mobile terminal 100 and the mobile terminal 100 can be converted for the user to remote control the mobile terminal 100.

Also, against the case in which the user goes to work, with leaving the mobile terminal 100 at home, the mobile terminal 100 is changed into a call incoming state when it is spaced apart the third distance or more from the wearable devices 310, 320, 330 and 340 and a call signal received by the mobile terminal may be controlled to be transmitted to a wire telephone of the user's company.

When the mobile terminal is spaced apart the third distance or more from the external devices, the information stored in the memory of the mobile terminal 100 may be transmitted to a server such as Cloud. Even if the user lost the mobile terminal, the information cannot be lost.

When the wearable device 310, 320, 330 or 340 is the headset 310, the sound is output from the headset 310 while the headset 310 is connected with the mobile terminal 100. However, the corresponding function is performed via wireless communication and the user happens to forget the sound output from the headset, in case the user is wearing the headset 310 on the neck, not listening to the music. In other words, when a call is received by the mobile terminal, the user unconsciously brings the mobile terminal 100 next to the face to try to answer the call.

To prevent such problems, the sound output from the headset 310 may be output from the receiver of the mobile terminal 100 after stopping the wireless communication connection with the headset 310, in case the distance between the headset 310 and the mobile terminal is close to a fourth distance (e.g., 10 cm or less).

Figure 39:
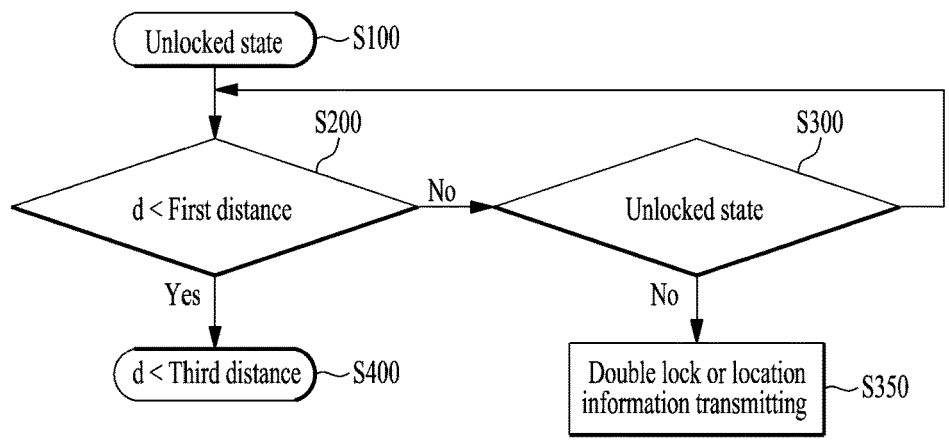
FIG. 39 is a diagram illustrating a control method in accordance with a distance with an external device in a state where a mobile terminal according to one embodiment is unlocked.
Figure 40:
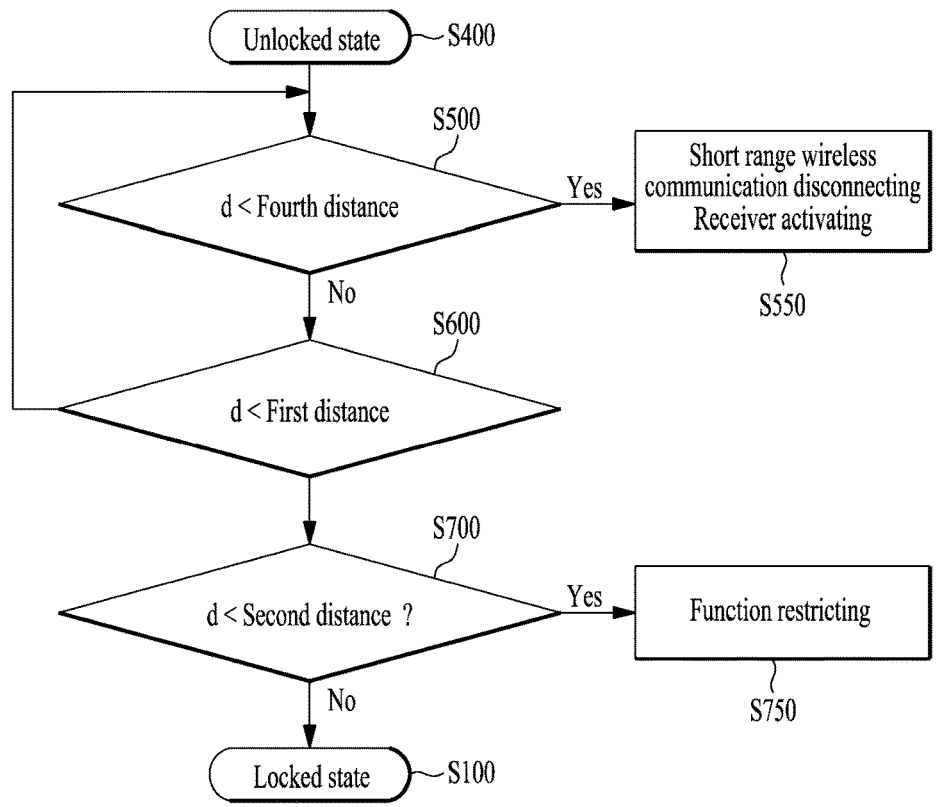
FIG. 40 is a diagram illustrating a control method in accordance with a distance with an external device in a state of a mobile terminal according to one embodiment is locked.

FIG. 39 is a diagram illustrating a control method in accordance with the distance between the external device 300 and the mobile terminal 100 in a state where the mobile terminal 100 is unlocked. FIG. 40 is a diagram illustrating a control method in accordance with the distance between the external device 300 and the mobile terminal 100 in a state where the mobile terminal 100 is locked. Referring to FIGS. 39 and 40, the control method of the mobile terminal in accordance with the distance between the wearable device 310, 320, 330 or 340 mentioned above and the mobile terminal 100 will be described in order.

When the mobile terminal 100 in a locked state (S100) is spaced apart a first distance or less from the wearable device 310, 320, 330 or 340, the locked state of the mobile terminal 100 is unlocked (S250) and the user may use the mobile terminal 100 immediately.

However, when the mobile terminal 100 is spaced apart a third distance or more (S300), it may be determined that the mobile terminal 100 is lost and the state of the mobile terminal 100 is changed into a double locked state (S350) or location information is transmitted to a server or another mobile terminal or the mobile terminal 100 may be remote controlled. Or, when a call signal is received, the call of the mobile terminal may be incoming to another mobile terminal.

When the headset 310 is located within a fourth distance from the mobile terminal 100 (S500), the mobile terminal 100 may be controlled to block the connection with the headset 310 and to output the sound via the receiver (S550). Only when a call signal is transmitted/received, the corresponding control may be performed.

It is not necessary to determine whether the wearable devices 310, 320, 330 and 340 except the headset 310 are spaced apart a fourth distance or less from the mobile terminal. Within the first distance (S600), it is determined that the user is using the mobile terminal and that the unlocked state of the mobile terminal is kept (S400).

When the wearable devices 310, 320, 330 and 340 are spaced apart the first distance or more and the second distance or less (S700), several functions are restricted and only preset functions can be allowed to use. As mentioned above, only the camera application can be used or only implemented photographs, video files, document files can be read. Only the function implemented by the user can be used and use of the other functions can be restricted (S750).

If the wearable devices 310, 320, 330 and 340 are spaced apart the second distance or more from the mobile terminal 100, it is determined that the user is not using the mobile terminal 100 and the state of the mobile terminal is changed into a locked state (S100).

Figure 41:
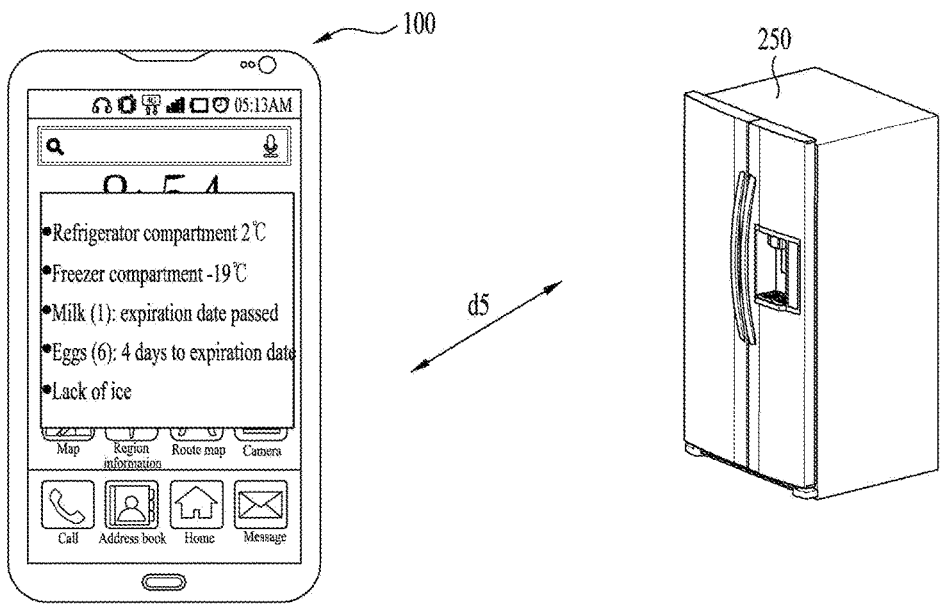
FIGS. 41 and 42 are diagrams illustrating a mobile terminal when an external device is located within a fifth distance.
Figure 42:
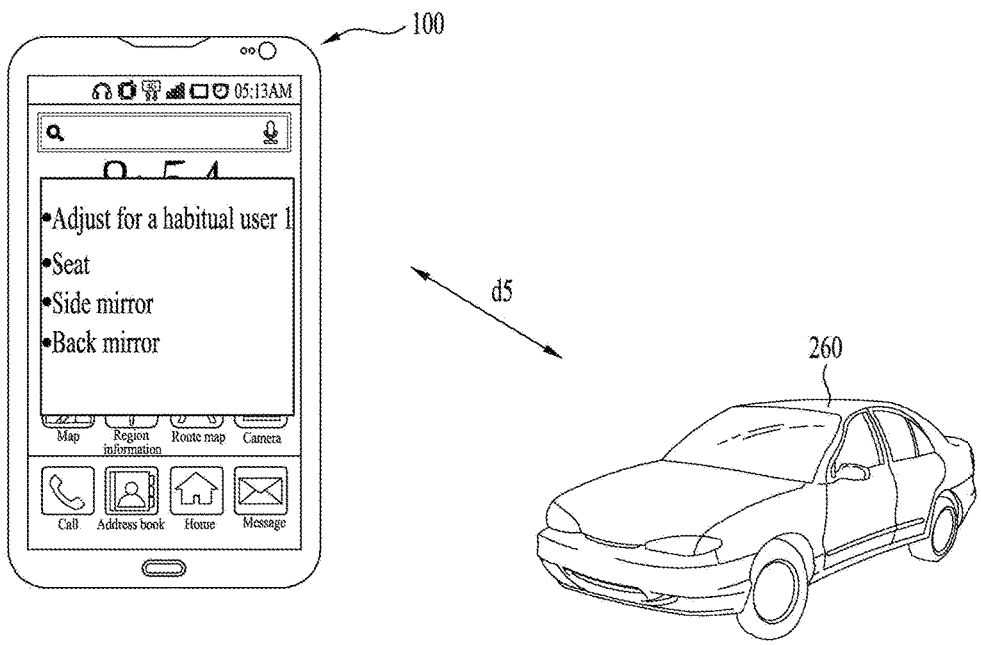

FIGS. 41 and 42 are diagrams illustrating the mobile terminal 100 when the external device 300 is spaced apart a fifth distance or less from the mobile terminal 100. Rather than the wearable devices 310, 320, 330 and 340, the external device 300 may be connected to the mobile terminal 100 via wireless communication. The external device 300 may be an electric home appliance 400 (e.g., a refrigerator, a washing machine, an air conditioner and a television) or a vehicle 500 (e.g., an automobile and a motorcycle).

In case the external device is the electric home appliance, information is received from the external device 300 via the wireless communication unit 121 and the received information may be output on the display. Or, the external device 300 may be controlled via the wireless communication unit 121.

When the mobile terminal 100 is approaching the refrigerator within a fifth distance in case the external device 300 is a refrigerator 400, information on the temperature of the refrigerator, the amount of the remaining foods stored in the refrigerator and the expiration dates of the foods may be transmitted to the user. In addition, the user can control the refrigerator, using the mobile terminal 100, and an auxiliary control button and an output screen provided in the refrigerator 400 may be omitted.

As shown in FIG. 12, in case the external device is the automobile 500, a seat, adjusting of a back mirror and a side mirror of the vehicle and setting of playing music may be controlled based on the user information. However, when the mobile terminal 100 is connected, the position of the back mirror and the position of the side mirror may be adjusted for an optimal driving state based on the driver's height, sitting height, leg length and arm length set in the mobile terminal 100.

A music taste may differ based on each of drivers and the information about the music taste is provided. When the information is provided, the genre of played music may be changed.

According to at least one embodiment of the disclosure, the mobile terminal may be automatically controlled based on the distance with the external device 300 and the inconvenience of operating the mobile terminal may be minimized. The level of authority for use may be differentiated and the information can be protected.

Even if the mobile terminal is lost, the location information and the remote control for the mobile terminal 100 may be enabled, to help finding the mobile terminal 100. Also, the electric home appliances or vehicles may be operated easily, using the mobile terminal 100.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless sound equipment comprising:
a neck band formed in a curved shape;
a first receiver holder and a second receiver holder provided at opposite ends of the neck band;
a first receiver coupled/decoupled to/from the first receiver holder;
a second receiver coupled/decoupled to/from the second receiver holder;
a first switch and a second switch provided at opposite ends of the neck band, the first switch being switchable between an ON state when the first receiver is decoupled from the first receiver holder and an OFF state when the first receiver is coupled to the first receiver holder, the second switch being switchable between an ON state when the second receiver is decoupled from the second receiver holder and an OFF state when the second receiver is coupled to the second receiver holder;
a wireless communication module configured to transmit/receive a signal to/from a mobile terminal; and
a controller configured to generate control commands to control the mobile terminal based on the ON/Off state change of the first and second switches.

2. The wireless sound equipment of claim 1, wherein the controller generates
a first control signal, when the first switch is changed into the ON state, with the second switch in the OFF state,
a second control signal, when the second switch is changed into the ON state, with the first switch in the ON state, and
a third control signal, when the second switch is changed into the OFF state, with the first switch in an ON state, the third control signal being the opposite of the second control signal.

3. The wireless sound equipment of claim 2, wherein, when the first control signal is generated, the controller provides a contact list to the display of the mobile terminal or a phone number input keypad to the display or connects a call to the person on the other line of the call signal during receiving a call signal.

4. The wireless sound equipment of claim 2, wherein the controller increases/decreases a volume of the mobile terminal or decreases a volume when the second/third control signal is generated during the talk on the phone.

5. The wireless sound equipment of claim 2, wherein the controller generates a fourth control signal, when the first switch is changed into the OFF state, with the second switch in the OFF state, the fourth control signal ending a function activated by the first control signal.

6. The wireless sound equipment of claim 2, wherein the controller is further configured to:
generate a fifth control signal, when the second switch is changed into an ON state, with the first switch in an OFF state, and
provide a list of files to the display of the mobile terminal when the fifth control signal generates.

7. The wireless sound equipment of claim 2, wherein the controller is further configured to:
generate a sixth control signal, when the first switch is changed into an ON state with a second switch in an ON state, and
generate a seventh control signal, when the first switch is changed into an OFF state with the second switch in an ON state, the seventh control signal including a command for performing the reverse operation of the sixth control signal.

8. The wireless sound equipment of claim 7, wherein the sixth control signal includes a playing command for playing one of the multimedia files, and the seventh control signal includes a command for stopping the multimedia file playing.

9. The wireless sound equipment of claim 1, wherein the controller is further configured to:

generate an eighth control signal, when the second switch is changed into an ON state with the first switch in an OFF state, the eighth control signal ending the function activated by the fifth control signal.

10. The wireless sound equipment of claim 1, wherein the switch is one of:

a push button pressed or projected from the receiver holder and the second receiver holder in accordance with the decoupling of the first receiver and the second receiver, a hall sensor for sensing magnets provided in the first receiver and the second receiver, and a proximity sensor for sensing the approach of the first receiver or second receiver.

11. The wireless sound equipment of claim 1, further comprising:

an audio cable extending from the neck band and connecting with the one of the first receiver and the second receiver;

a reel for winding the audio cable therearound; and a rotary member for rotating the reel to wind the audio cable around the reel, wherein the switch senses the rotational number of the reel to sense whether the first receiver and the second receiver are decoupled from the first receiver holder and the second receiver holder.

* * * * *